(12) United States Patent
Gunzelmann et al.

(10) Patent No.: US 12,732,260 B2
(45) Date of Patent: Sep. 8, 2026

(54) WIRELESS COMMUNICATION USING HYBRID RECONFIGURABLE INTELLIGENT SURFACES

(71) Applicant: Apple Inc., Cupertino, CA (US)

(72) Inventors: Bertram R Gunzelmann, Koenigsbrunn (DE); Florian Muhr, Viechtach (DE); Mari Kobayashi, Munich (DE)

(73) Assignee: Apple Inc., Cupertino, CA (US)

(*) Notice: Subject to any disclaimer, the term of this patent is extended or adjusted under 35 U.S.C. 154(b) by 630 days.

(21) Appl. No.: 18/164,516

(22) Filed: Feb. 3, 2023

(65) Prior Publication Data

US 2024/0250746 A1 Jul. 25, 2024

Related U.S. Application Data

(60) Provisional application No. 63/480,611, filed on Jan. 19, 2023.

(51) Int. Cl.
*H04B 7/155* (2006.01)
*H04B 7/024* (2017.01)

(52) U.S. Cl.
CPC ......... *H04B 7/15507* (2013.01); *H04B 7/024* (2013.01); *H04B 7/15528* (2013.01); *H04B 7/15592* (2013.01)

(58) Field of Classification Search
CPC ........................ H04B 7/15507; H04B 7/15592
See application file for complete search history.

(56) References Cited

U.S. PATENT DOCUMENTS

2023/0209122 A1* 6/2023 Yao ...................... H04B 7/0874 375/316
2023/0275647 A1* 8/2023 Yang .................. H04B 7/15507 455/7

(Continued)

OTHER PUBLICATIONS

Wenhao Cai et al., Practical Modeling and Beamforming for Intelligent Reflecting Surface Aided Wideband Systems, arXiv:2006.01465v1 [eess.SP], Jun. 2, 2020, pp. 1-12, IEEE.

(Continued)

*Primary Examiner* — Hashim S Bhatti
(74) *Attorney, Agent, or Firm* — Treyz Law Group, P.C.; Michael H. Lyons

(57) ABSTRACT

A communication system may include a wireless base station (BS), a user equipment (UE) device, and a hybrid reconfigurable intelligent surface (HRIS) co-located with the UE device. The HRIS may be used to offload beam management procedures to the BS. Adjustable devices on the HRIS may configure antenna elements of the HRIS to reflect incident signals from the BS and may configure antenna elements of the HRIS to receive the incident signals using a receiver according to a time domain multiplexing scheme, a spatial domain multiplexing scheme, and/or a power domain multiplexing scheme. The UE device may control the HRIS to switch between the schemes and to adjust a proportion of the incident signal that is reflected or received over time. The HRIS may be used in facilitating a beam acquisition and tracking procedure for the UE device and the BS, thereby minimizing resource consumption on the UE device.

17 Claims, 10 Drawing Sheets

(56) References Cited

U.S. PATENT DOCUMENTS

| | | | | |
|---|---|---|---|---|
| 2023/0318696 | A1* | 10/2023 | Sahraei | H04B 7/15542 455/11.1 |
| 2024/0039592 | A1* | 2/2024 | Dai | H04B 7/04013 |
| 2024/0195458 | A1* | 6/2024 | Oh | H04B 7/04013 |
| 2025/0071659 | A1* | 2/2025 | Xu | H04W 72/21 |

OTHER PUBLICATIONS

George C. Alexandropoulos et al., Hybrid Reconfigurable Intelligent Metasurfaces: Enabling Simultaneous Tunable Reflections and Sensing for 6G Wireless Communications, arXiv:2104.04690v1 [cs.IT], Apr. 10, 2021, pp. 1-7.

Idban Alamzadeh et al., A reconfigurable intelligent surface with integrated sensing capability, Scientific Reports, Oct. 20, 2021, pp. 1-10, Article No. 20737 (2021), Nature Publishing Group.

Haiyang Zhang et al., Channel Estimation with Hybrid Reconfigurable Intelligent Metasurfaces, arXiv:2206.03913v2 [cs.IT], Jun. 8, 2022, pp. 1-32.

Xidong Mu et al., Simultaneously Transmitting And Reflecting (STAR) RIS Aided Wireless Communications, arXiv:2104.01421v2 [cs.IT], Oct. 21, 2021, pp. 1-31, IEEE.

Marios Poulakis, Towards a More Intelligent RIS, IEEE ICC 2022—Special Workshop on Reconfigurable Intelligent Surfaces, 2022, pp. 1-18, IEEE ICC 2022.

Rafaela Schroeder et al., Two-Stage Channel Estimation for Hybrid RIS Assisted MIMO Systems, IEEE Transactions on Communications, Jul. 2022, pp. 4793-4806, vol. 70, No. 7, IEEE.

* cited by examiner

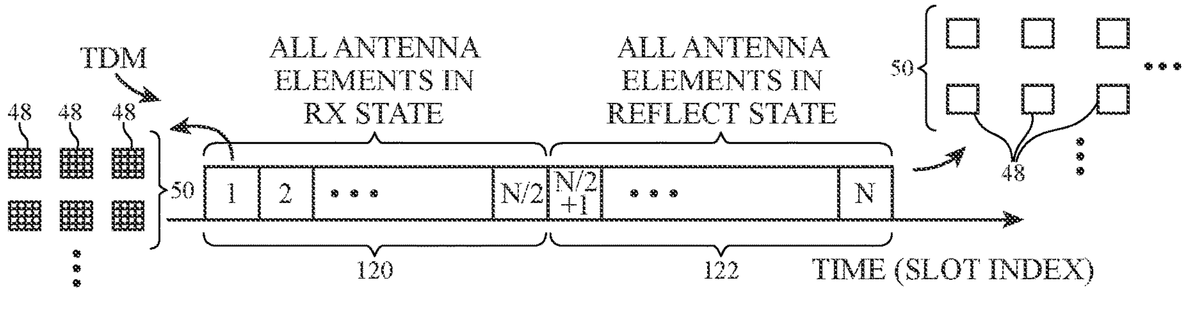
*FIG. 8*
SDM
FIRST SET OF ANTENNA ELEMENTS IN RX STATE WHILE SECOND SET OF ANTENNAS IN REFLECT STATE
1 2 • • • N
48A 48B TIME (SLOT INDEX)
50 48B
48A
*FIG. 9*
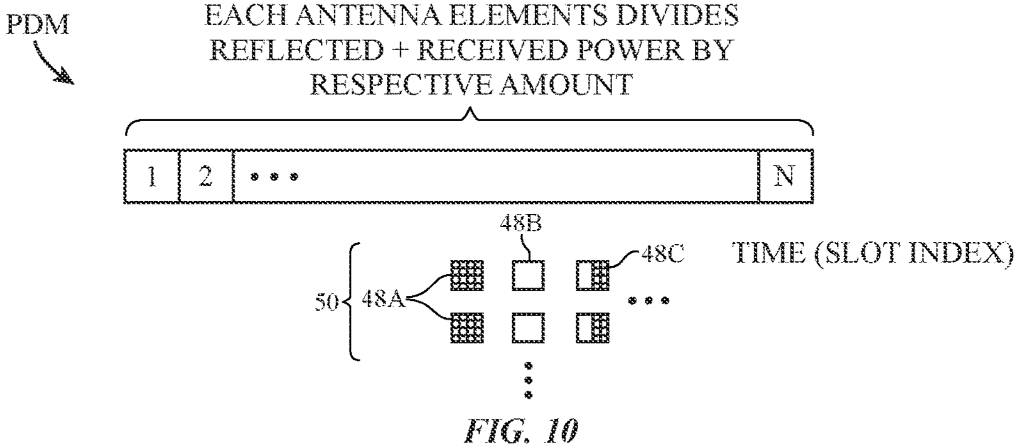
*FIG. 10*

WIRELESS COMMUNICATION USING HYBRID RECONFIGURABLE INTELLIGENT SURFACES

This application claims the benefit of U.S. Provisional Patent Application No. 63/480,611, filed Jan. 19, 2023, which is incorporated by reference herein in its entirety.

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry is used to perform communications using radio-frequency signals conveyed by the antennas.

As software applications on electronic devices become more data-intensive over time, demand has grown for electronic devices that support wireless communications at higher data rates. However, the maximum data rate supported by electronic devices is limited by the frequency of the radio-frequency signals. As the frequency of the radio-frequency signals increases, it can become increasingly difficult to perform satisfactory wireless communications because the signals become subject to significant over-the-air attenuation and typically require line-of-sight.

SUMMARY

A communication system may include a wireless base station (BS), a user equipment (UE) device, and a reconfigurable intelligent surface (RIS). The RIS may have an array of antenna elements and adjustable devices coupled to the array of antenna elements. The RIS may be a hybrid RIS having a receiver coupled to the array of antenna elements. The RIS may be co-located with the UE device. The RIS may program the adjustable devices according to a control signal received from the UE device.

The BS may transmit wireless signals. The adjustable devices may configure at least some of the antenna elements to reflect the wireless signals and may configure at least some of the antenna elements to receive the wireless signals using the receiver. If desired, some of the antenna elements may both receive and reflect the wireless signals. The adjustable devices may divide the resources of the RIS between reflecting the wireless signals and receiving the wireless signals according to a time domain multiplexing scheme, a spatial domain multiplexing scheme, and/or a power domain multiplexing scheme. The UE device may control the RIS to switch between different schemes over time. The UE device may control the RIS to adjust a proportion of the incident wireless signal that is reflected or received over time.

The RIS may be used in facilitating a beam acquisition procedure or a beam tracking procedure for the UE device and the BS. The wireless signals received by the RIS may be processed to identify and update an optimal signal beam of the RIS and thus the co-located UE device. The wireless signals reflected by the RIS may be received back at the BS. The BS may process the received reflected signals to identify and update an optimal signal beam of the BS. In this way, the RIS may be used to offload some of the beam acquisition and beam tracking procedures onto the BS from the UE device, thereby minimizing the power consumption and communication overhead of the UE device in performing beam acquisition and tracking.

An aspect of the disclosure provides a reconfigurable intelligent surface (RIS) co-located with a user equipment (UE) device. The RIS may include an array of antenna elements configured to transmit signals for the UE device. The RIS may include adjustable devices coupled to the antenna elements. The RIS may include a receiver, wherein the adjustable devices configure a first set of antenna elements in the array to pass an incident signal to the receiver and configure a second set of antenna elements in the array to reflect the incident signal.

An aspect of the disclosure provides a method of operating a user equipment (UE) device. The method can include reflecting and receiving an incident signal according to a multiplexing scheme using an array of antenna elements co-located with the UE device, the incident signal being transmitted by a wireless base station. The method can include conveying wireless data with the wireless base station using a signal beam of the array of antenna elements, the signal beam being selected based on the incident signal received by the RIS.

An aspect of the disclosure provides a method of operating a wireless base station to communicate with a user equipment (UE) device. The method can include transmitting, using one or more phased antenna arrays, a wireless signal while sweeping over a set of signal beams of the one or more phased antenna arrays. The method can include receiving, using the one or more phased antenna arrays, a reflected version of the wireless signal that has reflected off a reconfigurable intelligent surface (RIS) co-located with the UE device. The method can include generating, at one or more processors, wireless performance metric data from the reflected version of the wireless signal. The method can include transmitting, using the one or more phased antenna arrays, payload data to the UE device using a signal beam from the set of signal beams that is selected based on the wireless performance metric data.

BRIEF DESCRIPTION OF THE DRAWINGS

FIG. 8 is a diagram showing how an illustrative hybrid RIS may be configured to reflect and receive incident wireless signals using a time domain multiplexing scheme in accordance with some embodiments.

FIG. 9 is a diagram showing how an illustrative hybrid RIS may be configured to reflect and receive incident wireless signals using a spatial domain multiplexing scheme in accordance with some embodiments.

FIG. 10 is a diagram showing how an illustrative hybrid RIS may be configured to reflect and receive incident wireless signals using a power domain multiplexing scheme in accordance with some embodiments.

DETAILED DESCRIPTION

Figure 1:
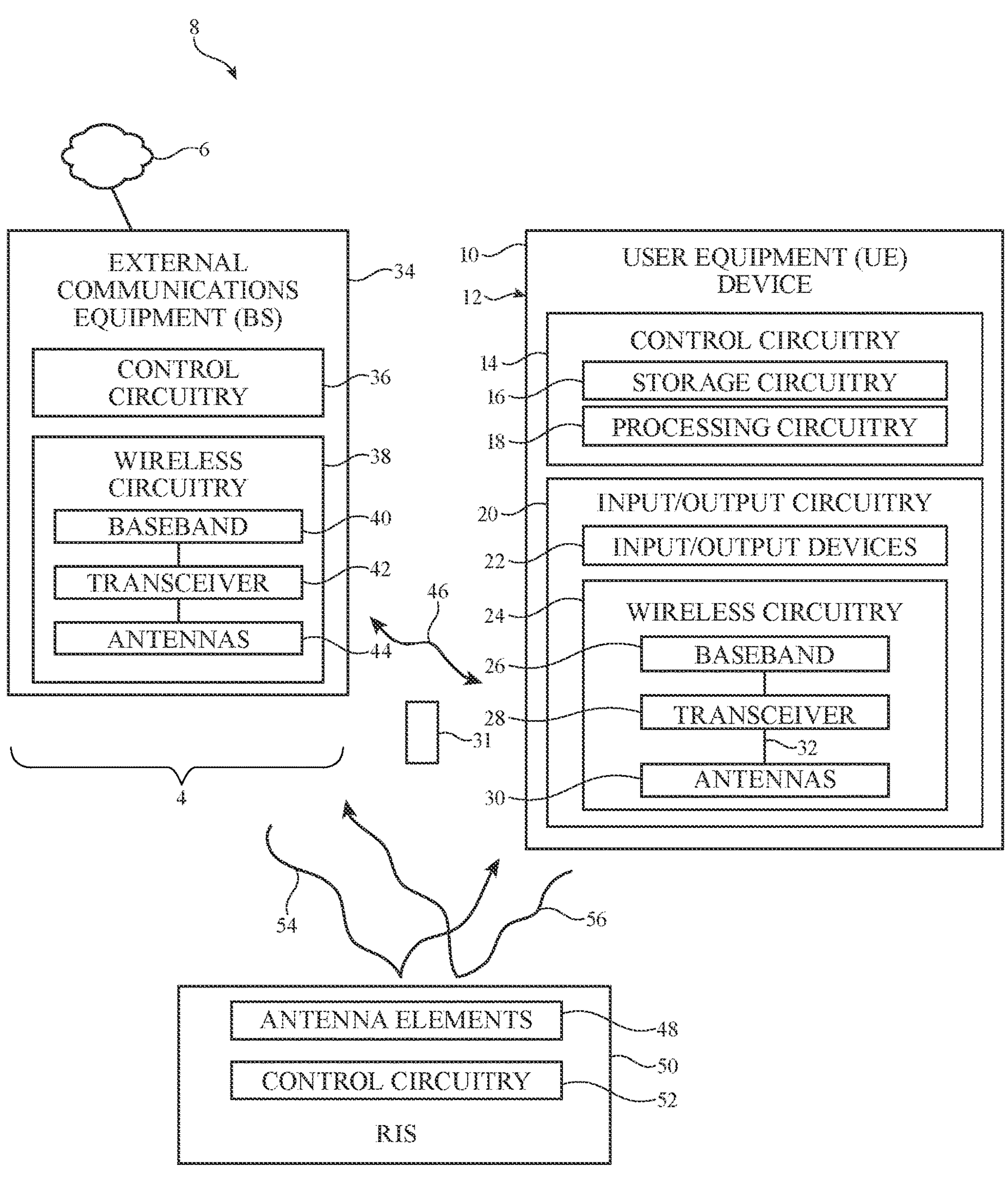
FIG. 1 is a schematic block diagram of an illustrative communications system having a user equipment (UE) device, external communications equipment, and a reconfigurable intelligent surface (RIS) in accordance with some embodiments.

FIG. 1 is a schematic diagram of an illustrative communications system 8 (sometimes referred to herein as communications network 8) for conveying wireless data between communications terminals. Communications system 8 may include network nodes (e.g., communications terminals). The network nodes may include user equipment (UE) such as one or more UE devices 10 (sometimes referred to herein simply as UE 10). The network nodes may also include external communications equipment (e.g., communications equipment other than UE devices 10) such as external communications equipment 34. External communications equipment 34 (sometimes referred to herein simply as external equipment 34) may include one or more electronic devices and may be a wireless base station, wireless access point, or other wireless equipment for example. An implementation in which external communications equipment 34 forms a wireless base station (BS) is described herein as an example. External communications equipment 34 may therefore sometimes be referred to herein as BS 34. UE device 10 and BS 34 may communicate with each other using one or more wireless communications links. If desired, UE devices 10 may wirelessly communicate with BS 34 without passing communications through any other intervening network nodes in communications system 8 (e.g., UE devices 10 may communicate directly with BS 34 over-the-air).

BS 34 may be communicably coupled to one or more other network nodes 6 in a larger communications network 4 via wired and/or wireless links. Network 4 may include one or more wired communications links (e.g., communications links formed using cabling such as ethernet cables, radio-frequency cables such as coaxial cables or other transmission lines, optical fibers or other optical cables, etc.), one or more wireless communications links (e.g., short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles, etc.), communications gateways, wireless access points, base stations, switches, routers, servers, modems, repeaters, telephone lines, network cards, line cards, portals, user equipment (e.g., computing devices, mobile devices, etc.), etc. Network 4 may include communications (network) nodes or terminals coupled together using these components or other components (e.g., some or all of a mesh network, relay network, ring network, local area network, wireless local area network, personal area network, cloud network, star network, tree network, or networks of communications nodes having other network topologies), the Internet, combinations of these, etc. UE devices 10 may send data to and/or may receive data from other nodes or terminals in network 4 via BS 34 (e.g., BS 34 may serve as an interface between user equipment devices 10 and the rest of the larger communications network). Network 4 may be managed, operated, controlled, or run by a corresponding network service provider (e.g., a cellular network carrier).

User equipment (UE) device 10 of FIG. 1 is an electronic device (sometimes referred to herein as electronic device 10 or device 10) and may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, equipment that implements the functionality of two or more of these devices, or other electronic equipment.

As shown in the functional block diagram of FIG. 1, UE device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, part or all of housing 12 may be formed from dielectric or other low-conductivity material (e.g., glass, ceramic, plastic, sapphire, etc.). In other situations, housing 12 or at least some of the structures that make up housing 12 may be formed from metal elements.

UE device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors such as microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols sometimes referred to as Wi-Fi®), protocols for other short-range wireless communications links such as the Bluetooth® protocol or other wireless personal area network (WPAN) protocols, IEEE 802.1 lad protocols (e.g., ultra-wideband protocols), cellular telephone protocols (e.g., 3G protocols, 4G (LTE) protocols, 3GPP Fifth Generation (5G) New Radio (NR) protocols, Sixth Generation (6G) protocols, sub-THz protocols, THz protocols, etc.), antenna diversity protocols, satellite navigation system protocols (e.g., global positioning system (GPS) protocols, global navigation satellite system (GLONASS) protocols, etc.), antenna-based spatial ranging protocols, optical communications protocols, or any other desired communications protocols. Each communications protocol may be associated with a corresponding radio access technology (RAT) that specifies the physical connection methodology used in implementing the protocol.

UE device 10 may include input-output circuitry 20. Input-output circuitry 20 may include input-output devices 22. Input-output devices 22 may be used to allow data to be supplied to UE device 10 and to allow data to be provided from UE device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to UE device 10 using wired or wireless connections (e.g., some of input-output devices 22 may be peripherals that are coupled to a main processing unit or other portion of UE device 10 via a wired or wireless link).

Input-output circuitry 20 may include wireless circuitry 24 to support wireless communications. Wireless circuitry 24 (sometimes referred to herein as wireless communications circuitry 24) may include baseband circuitry such as baseband circuitry 26 (e.g., one or more baseband processors and/or other circuitry that operates at baseband), radio-frequency (RF) transceiver circuitry such as transceiver 28, and one or more antennas 30. If desired, wireless circuitry 24 may include multiple antennas 30 that are arranged into a phased antenna array (sometimes referred to as a phased array antenna) that conveys radio-frequency signals within a corresponding signal beam that can be steered in different directions. Baseband circuitry 26 may be coupled to transceiver 28 over one or more baseband data paths. Transceiver 28 may be coupled to antennas 30 over one or more radio-frequency transmission line paths 32. If desired, radio-frequency front end circuitry may be disposed on radio-frequency transmission line path(s) 32 between transceiver 28 and antennas 30.

In the example of FIG. 1, wireless circuitry 24 is illustrated as including only a single transceiver 28 and a single radio-frequency transmission line path 32 for the sake of clarity. In general, wireless circuitry 24 may include any desired number of transceivers 28, any desired number of radio-frequency transmission line paths 32, and any desired number of antennas 30. Each transceiver 28 may be coupled to one or more antennas 30 over respective radio-frequency transmission line paths 32. Radio-frequency transmission line path 32 may be coupled to antenna feeds on one or more antenna 30. Each antenna feed may, for example, include a positive antenna feed terminal and a ground antenna feed terminal. Radio-frequency transmission line path 32 may have a positive transmission line signal path that is coupled to the positive antenna feed terminal and may have a ground transmission line signal path that is coupled to the ground antenna feed terminal. This example is merely illustrative and, in general, antennas 30 may be fed using any desired antenna feeding scheme.

Radio-frequency transmission line path 32 may include transmission lines that are used to route radio-frequency antenna signals within device 10. Transmission lines in device 10 may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in device 10 such as transmission lines in radio-frequency transmission line path 32 may be integrated into rigid and/or flexible printed circuit boards. In one embodiment, radio-frequency transmission line paths such as radio-frequency transmission line path 32 may also include transmission line conductors integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

In performing wireless transmission (e.g., in an uplink (UL) direction from UE device 10 to BS 34), baseband circuitry 26 may provide baseband signals to transceiver 28 (e.g., baseband signals that include wireless data for transmission). Transceiver 28 may include circuitry for converting the baseband signals received from baseband circuitry 26 into corresponding radio-frequency signals (e.g., for modulating the wireless data onto one or more carriers for transmission, synthesizing a transmit signal, etc.). For example, transceiver 28 may include mixer circuitry for up-converting the baseband signals to radio frequencies prior to transmission over antennas 30. Transceiver 28 may also include digital to analog converter (DAC) and/or analog to digital converter (ADC) circuitry for converting signals between digital and analog domains. Transceiver 28 may transmit the radio-frequency signals over antennas 30 via radio-frequency transmission line path 32. Antennas 30 may transmit the radio-frequency signals to external wireless equipment by radiating the radio-frequency signals into free space.

In performing wireless reception (e.g., in a downlink (DL) direction from BS 34 to UE device 10), antennas 30 may receive radio-frequency signals from BS 34. The received radio-frequency signals may be conveyed to transceiver 28 via radio-frequency transmission line path 32. Transceiver 28 may include circuitry for converting the received radio-frequency signals into corresponding baseband signals. For example, transceiver 28 may include mixer circuitry for down-converting the received radio-frequency signals to baseband frequencies prior to conveying the baseband signals to baseband circuitry 26 and may include demodulation circuitry for demodulating wireless data from the received signals.

Front end circuitry disposed on radio-frequency transmission line path 32 may include radio-frequency front end components that operate on radio-frequency signals conveyed over radio-frequency transmission line path 32. If desired, the radio-frequency front end components may be formed within one or more radio-frequency front end modules (FEMs). Each FEM may include a common substrate such as a printed circuit board substrate for each of the radio-frequency front end components in the FEM. The radio-frequency front end components in the front end circuitry may include switching circuitry (e.g., one or more radio-frequency switches), radio-frequency filter circuitry (e.g., low pass filters, high pass filters, notch filters, band pass filters, multiplexing circuitry, duplexer circuitry, diplexer circuitry, triplexer circuitry, etc.), impedance matching circuitry (e.g., circuitry that helps to match the impedance of antennas 30 to the impedance of radio-frequency transmission line path 32), antenna tuning circuitry (e.g., networks of capacitors, resistors, inductors, and/or switches that adjust the frequency response of antennas 30), radio-frequency amplifier circuitry (e.g., power amplifier circuitry and/or low-noise amplifier circuitry), radio-frequency coupler circuitry, charge pump circuitry, power management circuitry, digital control and interface circuitry, and/or any other desired circuitry that operates on the radio-frequency signals transmitted and/or received by antennas 30.

While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, baseband circuitry 26 and/or portions of transceiver 28 (e.g., a host processor on transceiver 28) may form a part of control circuitry 14. Baseband circuitry 26 may, for example, access a communication protocol stack on control circuitry 14 (e.g., storage circuitry 16) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

The term "convey wireless signals" as used herein means the transmission and/or reception of the wireless signals (e.g., for performing unidirectional and/or bidirectional wireless communications with external wireless communications equipment). Antennas 30 may transmit the wireless signals by radiating the signals into free space (or to free space through intervening device structures such as a dielectric cover layer). Antennas 30 may additionally or alternatively receive the wireless signals from free space (e.g., through intervening devices structures such as a dielectric cover layer). The transmission and reception of wireless signals by antennas 30 each involve the excitation or resonance of antenna currents on an antenna resonating (radiating) element in the antenna by the wireless signals within the frequency band(s) of operation of the antenna.

Transceiver circuitry 26 may use antenna(s) 30 to transmit and/or receive wireless signals that convey wireless communications data between device 10 and BS 34 (e.g., one or more other devices such as device 10, a wireless access point or base station, etc.). The wireless communications data may be conveyed bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc.

Additionally or alternatively, wireless circuitry 24 may use antenna(s) 30 to perform wireless (radio-frequency) sensing operations. The sensing operations may allow device 10 to detect (e.g., sense or identify) the presence, location, orientation, and/or velocity (motion) of objects external to device 10. Control circuitry 14 may use the detected presence, location, orientation, and/or velocity of the external objects to perform any desired device operations. As examples, control circuitry 14 may use the detected presence, location, orientation, and/or velocity of the external objects to identify a corresponding user input for one or more software applications running on device 10 such as a gesture input performed by the user's hand(s) or other body parts or performed by an external stylus, gaming controller, head-mounted device, or other peripheral devices or accessories, to determine when one or more antennas 30 needs to be disabled or provided with a reduced maximum transmit power level (e.g., for satisfying regulatory limits on radio-frequency exposure), to determine how to steer (form) a radio-frequency signal beam produced by antennas 30 for wireless circuitry 24 (e.g., in scenarios where antennas 30 include a phased array of antennas 30), to map or model the environment around device 10 (e.g., to produce a software model of the room where device 10 is located for use by an augmented reality application, gaming application, map application, home design application, engineering application, etc.), to detect the presence of obstacles in the vicinity of (e.g., around) device 10 or in the direction of motion of the user of device 10, etc. The sensing operations may, for example, involve the transmission of sensing signals (e.g., radar waveforms), the receipt of corresponding reflected signals (e.g., the transmitted waveforms that have reflected off of external objects), and the processing of the transmitted signals and the received reflected signals (e.g., using a radar scheme).

Wireless circuitry 24 may transmit and/or receive wireless signals within corresponding frequency bands of the electromagnetic spectrum (sometimes referred to herein as communications bands or simply as "bands"). The frequency bands handled by wireless circuitry 24 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, 6G bands at sub-THz or THz frequencies greater than about 100 GHz, etc.), other centimeter or millimeter wave frequency bands between 10-100 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Over time, software applications on electronic devices such as device 10 have become more and more data intensive. Wireless circuitry on the electronic devices therefore needs to support data transfer at higher and higher data rates. In general, the data rates supported by the wireless circuitry are proportional to the frequency of the wireless signals conveyed by the wireless circuitry (e.g., higher frequencies can support higher data rates than lower frequencies). Wireless circuitry 24 may convey centimeter and millimeter wave signals to support relatively high data rates (e.g., because centimeter and millimeter wave signals are at relatively high frequencies between around 10 GHz and 100 GHz). However, the data rates supported by centimeter and millimeter wave signals may still be insufficient to meet all the data transfer needs of device 10. To support even higher data rates such as data rates up to 5-100 Gbps or higher, wireless circuitry 24 may convey wireless signals at frequencies greater than about 100 GHz.

As shown in FIG. 1, wireless circuitry 24 may transmit wireless signals 46 to BS 34 and/or may receive wireless signals 46 from BS 34. Wireless signals 46 may be tremendously high frequency (THF) signals (e.g., sub-THz or THz signals) at frequencies greater than around 100 GHz (e.g., between 100 GHz and 1 THz, between 80 GHz and 10 THz, between 100 GHz and 10 THz, between 100 GHz and 2 THz, between 200 GHz and 1 THz, between 300 GHz and 1 THz, between 300 GHz and 2 THz, between 70 GHz and 2 THz, between 300 GHz and 10 THz, between 100 GHz and 800 GHz, between 200 GHz and 1.5 THz, or within any desired sub-THz, THz, THF, or sub-millimeter frequency band such as a 6G frequency band), may be millimeter (mm) or centimeter (cm) wave signals between 10 GHz and around 70 GHz (e.g., 5G NR FR2 signals), or may be signals at frequencies less than 10 GHz (e.g., 5G NR FR1 signals, LTE signals, 3G signals, 2G signals, WLAN signals, Bluetooth signals, UWB signals, etc.).

If desired, the high data rates supported by THF signals may be leveraged by device 10 to perform cellular telephone voice and/or data communications (e.g., while supporting spatial multiplexing to provide further data bandwidth), to perform spatial ranging operations such as radar operations to detect the presence, location, and/or velocity of objects external to device 10, to perform automotive sensing (e.g., with enhanced security), to perform health/body monitoring on a user of device 10 or another person, to perform gas or chemical detection, to form a high data rate wireless connection between device 10 and another device or peripheral device (e.g., to form a high data rate connection between a display driver on device 10 and a display that displays ultra-high resolution video), to form a remote radio head (e.g., a flexible high data rate connection), to form a THF chip-to-chip connection within device 10 that supports high data rates (e.g., where one antenna 30 on a first chip in device 10 transmits THF signals 32 to another antenna 30 on a second chip in device 10), and/or to perform any other desired high data rate operations.

In implementations where wireless circuitry 24 conveys THF signals, the wireless circuitry may include electro-optical circuitry if desired. The electro-optical circuitry may include light sources that generate first and second optical local oscillator (LO) signals. The first and second optical LO signals may be separated in frequency by the intended frequency of wireless signals 46. Wireless data may be modulated onto the first optical LO signal and one of the optical LO signals may be provided with an optical phase shift (e.g., to perform beamforming). The first and second optical LO signals may illuminate a photodiode that produces current at the frequency of wireless signals 46 when illuminated by the first and second optical LO signals. An antenna resonating element of a corresponding antenna 30 may convey the current produced by the photodiode and may radiate corresponding wireless signals 46. This is merely illustrative and, in general, wireless circuitry 24 may generate wireless signals 46 using any desired techniques.

Antennas 30 may be formed using any desired antenna structures. For example, antennas 30 may include antennas with resonating elements that are formed from loop antenna structures, patch antenna structures, inverted-F antenna structures, slot antenna structures, planar inverted-F antenna structures, helical antenna structures, monopole antennas, dipoles (e.g., planar dipole antennas such as bowtie antennas), hybrids of these designs, etc. Parasitic elements may be included in antennas 30 to adjust antenna performance.

If desired, two or more of antennas 30 may be integrated into a phased antenna array (sometimes referred to herein as a phased array antenna or an array of antenna elements). Each antenna 30 in the phased antenna array forms a respective antenna element of the phased antenna array. Each antenna 30 in the phased antenna array has a respective phase and magnitude controller that imparts the radio-frequency signals conveyed by that antenna with a respective phase and magnitude. The respective phases and magnitudes may be selected (e.g., by control circuitry 14) to configure the radio-frequency signals conveyed by the antennas 30 in the phased antenna array to constructively and destructively interfere in such a way that the radio-frequency signals collectively form a signal beam (e.g., a signal beam of wireless signals 46) oriented in a corresponding beam pointing direction (e.g., a direction of peak gain).

The control circuitry may adjust the phases and magnitudes to change (steer) the orientation of the signal beam (e.g., the beam pointing direction) to point in other directions over time. This process may sometimes also be referred to herein as beamforming. Beamforming may boost the gain of wireless signals 46 to help overcome over-the-air attenuation and the signal beam may be steered over time to point towards BS 34 even as the position and orientation of UE device 10 changes. The signal beams formed by antennas 30 of UE device 10 may sometimes be referred to herein as UE beams or UE signal beams. Each UE beam may be oriented in a different respective direction (e.g., a beam pointing direction of peak signal gain). Each UE beam may be labeled by a corresponding UE beam index. UE device 10 may include or store a codebook (sometimes referred to herein as a UE codebook) that maps each of its UE beam indices to the corresponding phase and magnitude settings for each antenna 30 in a phased antenna array that configure the phased antenna array to form the UE beam associated with that UE beam index.

As shown in FIG. 1, BS 34 may also include control circuitry 36 (e.g., control circuitry having similar components and/or functionality as control circuitry 14 in UE device 10) and wireless circuitry 38 (e.g., wireless circuitry having similar components and/or functionality as wireless circuitry 24 in UE device 10). Wireless circuitry 38 may include baseband circuitry 40 and transceiver 42 (e.g., transceiver circuitry having similar components and/or functionality as transceiver circuitry 28 in UE device 10) coupled to two or more antennas 44 (e.g., antennas having similar components and/or functionality as antennas 30 in UE device 10). Antennas 44 may be arranged in one or more phased antenna arrays (e.g., phased antenna arrays that perform beamforming similar to phased antenna arrays of antennas 30 on UE device 10).

BS 34 may use wireless circuitry 38 to transmit a signal beam of wireless signals 46 to UE device 10 (e.g., as DL signals transmitted in a DL direction) and/or to receive a signal beam of wireless signals 46 transmitted by UE device 10 (e.g., as UL signals transmitted in a UL direction). The signal beams formed by antennas 44 of BS 34 may sometimes be referred to herein as BS beams or BS signal beams. Each BS beam may be oriented in a different respective direction (e.g., a beam pointing direction of peak signal gain). Each BS beam may be labeled by a corresponding BS beam index. BS 34 may include or store a codebook (sometimes referred to herein as a BS codebook) that maps each of its BS beam indices to the corresponding phase and magnitude settings for each antenna 44 in a phased antenna array that configure the phased antenna array to form the BS beam associated with that BS beam index.

While communications at high frequencies allow for extremely high data rates (e.g., greater than 100 Gbps), wireless signals 46 at such high frequencies are subject to significant attenuation during propagation over-the-air. Integrating antennas 30 and 44 into phased antenna arrays helps to counteract this attenuation by boosting the gain of the signals within a signal beam. However, signal beams are highly directive and may require a line-of-sight (LOS) between UE device 10 and BS 34. If an external object is present between BS 34 and UE device 10, the external object may block the LOS between UE device 10 and BS 34, which can disrupt wireless communications using wireless signals 46. If desired, a reflective device such as a reconfigurable intelligent surface (RIS) may be used to allow UE device 10 and BS 34 to continue to communicate using wireless signals 46 even when an external object blocks the LOS between UE device 10 and BS 34 (or whenever direct over-the-air communications between BS 34 and UE device 10 otherwise exhibits less than optimal performance).

As shown in FIG. 1, system 8 may include one or more reconfigurable intelligent surfaces (RIS's) such as RIS 50. RIS 50 may sometimes also be referred to as an intelligent reconfigurable surface, an intelligent reflective/reflecting surface, a reflective intelligent surface, a reflective surface, a reflective device, a reconfigurable reflective device, a reconfigurable reflective surface, or a reconfigurable surface. BS 34 may be separated from UE device 10 by a line-of-sight (LOS) path. In some circumstances, an external object such as object 31 may block the LOS path. Object 31 may be, for example, part of a building such as a wall, window, floor, or ceiling (e.g., when UE device 10 is located inside), furniture, a body or body part, an animal, a cubicle wall, a vehicle, a landscape feature, or other obstacles or objects that may block the LOS path between BS 34 and UE device 10.

In the absence of external object 31, BS 34 may form a corresponding BS beam of wireless signals 46 oriented in the direction of UE device 10 and UE device 10 may form a corresponding UE beam of wireless signals 46 oriented in the direction of BS 34. UE device 10 and BS 34 can then convey wireless signals 46 over their respective signal beams and the LOS path. However, the presence of external object 31 prevents wireless signals 46 from being conveyed over the LOS path.

RIS 50 may be placed or disposed within system 8 in such a way so as to allow RIS 50 to reflect wireless signals 46 between UE device 10 and BS 34 despite the presence of external object 31 within the LOS path. More generally, RIS 50 may be used to reflect wireless signals 46 between UE device 10 and BS 34 when reflection via RIS 50 offers superior radio-frequency propagation conditions relative to the LOS path regardless of the presence of external object 31 (e.g., when the LOS path between BS 34 and RIS 50 and the LOS path between RIS 50 and UE device 10 exhibit superior propagation/channel conditions than the direct LOS path between UE device 10 and BS 34).

When RIS 50 is placed within system 8, BS 34 may transmit wireless signals 46 towards RIS 50 (e.g., within a BS beam oriented towards RIS 50 rather than towards UE device 10) and RIS 50 may reflect the wireless signals towards UE device 10, as shown by arrow 54. Conversely, UE device 10 may transmit wireless signals 46 towards RIS 50 (e.g., within a UE beam oriented towards RIS 50 rather than towards BS 34) and RIS 50 may reflect the wireless signals towards BS 34, as shown by arrow 56.

RIS 50 is an electronic device that includes a two-dimensional surface of engineered material having reconfigurable properties for performing (e.g., reflecting) communications between BS 34 and UE device 10. RIS 50 may include an array of reflective elements such as antenna elements 48 on an underlying substrate. Antenna elements 48 may also sometimes be referred to herein as reflective elements 48, reconfigurable antenna elements 48, reconfigurable reflective elements 48, reflectors 48, or reconfigurable reflectors 48.

The substrate may be a rigid or flexible printed circuit board, a package, a plastic substrate, meta-material, or any other desired substrate. The substrate may be planar or may be curved in one or more dimensions. If desired, the substrate and antenna elements 48 may be enclosed within a housing. The housing may be formed from materials that are transparent to wireless signals 46. If desired, RIS 50 may be disposed (e.g., layered) on an underlying electronic device.

RIS 50 may also be provided with mounting structures (e.g., adhesive, brackets, a frame, screws, pins, clips, etc.) that can be used to affix or attach RIS 50 to an underlying structure such as another electronic device, a wall, the ceiling, the floor, furniture, etc. Disposing RIS 50 on a ceiling, wall, window, column, pillar, or at or adjacent to the corner of a room (e.g., a corner where two walls intersect, where a wall intersects with the floor or ceiling, where two walls and the floor intersect, or where two walls and the ceiling intersect), as examples, may be particularly helpful in allowing RIS 50 to reflect wireless signals between BS 34 and UE device 10 around various objects 31 that may be present (e.g., when BS 34 is located outside and UE device 10 is located inside, when BS 34 and UE device 10 are both located inside or outside, etc.).

RIS 50 may be a passive adaptively controlled reflecting surface and a powered device that includes control circuitry 52 that helps to control the operation of antenna elements 48 (e.g., one or more processors in control circuitry such as control circuitry 14). When electro-magnetic (EM) energy waves (e.g., waves of wireless signals 46) are incident on RIS 50, the wave is reflected by each antenna element 48 via re-radiation by each antenna element 48 with a respective phase and amplitude response. Antenna elements 48 may include passive reflectors (e.g., antenna resonating elements or other radio-frequency reflective elements). Each antenna element 48 may include an adjustable device that is programmed, set, and/or controlled by control circuitry 52 (e.g., using a control signal that includes a respective beamforming coefficient) to configure that antenna element 48 to reflect incident EM energy with the respective phase and amplitude response. The adjustable device may be a programmable photodiode, an adjustable impedance matching circuit, an adjustable phase shifter, an adjustable amplifier, a varactor diode, an antenna tuning circuit, combinations of these, etc.

Control circuitry 52 on RIS 50 may configure the reflective response of antenna elements 48 on a per-element or per-group-of-elements basis (e.g., where each antenna element has a respective programmed phase and amplitude response or the antenna elements in different sets/groups of antenna elements are each programmed to share the same respective phase and amplitude response across the set/group but with different phase and amplitude responses between sets/groups). The scattering, absorption, reflection, and diffraction properties of the entire RIS can therefore be changed overtime and controlled (e.g., by software running on the RIS or other devices communicably coupled to the RIS such as BS 34 or UE device 10).

One way of achieving the per-element phase and amplitude response of antenna elements 48 is by adjusting the impedance of antenna elements 48, thereby controlling the complex reflection coefficient that determines the change in amplitude and phase of the re-radiated signal. The control circuitry 52 on RIS 50 may configure antenna elements 48 to exhibit impedances that serve to reflect wireless signals 46 incident from particular incident angles onto particular output angles. The antenna elements 48 (e.g., the antenna impedances) may be adjusted to change the angle with which incident wireless signals 46 are reflected off of RIS 50.

For example, the control circuitry on RIS 50 may configure antenna elements 48 to reflect wireless signals 46 transmitted by BS 34 towards UE device 10 (as shown by arrow 54) and to reflect wireless signals 46 transmitted by UE device 10 towards BS 34 (as shown by arrow 56). In such an example, control circuitry 36 may configure (e.g., program) a phased antenna array of antennas 44 on BS 34 to form a BS beam oriented towards RIS 50, control circuitry 14 may configure (e.g., program) a phased antenna array of antennas 30 on UE device 10 to form a UE beam oriented towards RIS 50, control circuitry 52 may configure (e.g., program) antenna elements 48 to receive and re-radiate (e.g., effectively reflect) wireless signals incident from the direction of BS 34 towards/onto the direction of UE device 10 (as shown by arrow 54), and control circuitry 52 may configure (e.g., program) antenna elements 48 to receive and re-radiate (e.g., effectively reflect) wireless signals incident from the direction of UE device 10 towards-onto the direction of external equipment 34 (as shown by arrow 56). The antenna elements may be configured using respective beamforming coefficients. Control circuitry 52 on RIS 50 may set and adjust the adjustable devices coupled to antenna elements 48 (e.g., may set and adjust the impedances of antenna elements 48) over time to reflect wireless signals 46 incident from different selected incident angles onto different selected output angles.

To minimize the cost, complexity, and power consumption of RIS 50, RIS 50 may include only the components and control circuitry required to control and operate antenna elements 48 to reflect wireless signals 46. Such components and control circuitry may include, for example, the adjustable devices of antenna elements 48 as required to change the phase and magnitude responses of antenna elements 48 (based on corresponding beamforming coefficients) and thus the direction with which RIS 50 reflects wireless signals 46. The components may include, for example, components that adjust the impedances of antenna elements 48 so that each antenna element exhibits a respective complex reflection coefficient, which determines the phase and amplitude of the reflected (re-radiated) signal produced by each antenna element (e.g., such that the signals reflected across the array constructively and destructively interfere to form a reflected signal beam in a corresponding beam pointing direction).

All other components that would otherwise be present in UE device 10 or BS 34 may be omitted from RIS 50. For example, RIS 50 may be free from baseband circuitry (e.g., baseband circuitry 26 or 40) and/or transceiver circuitry (e.g., transceiver 42 or 28) coupled to antenna elements 48. Antenna elements 48 and RIS 50 may therefore be incapable of generating wireless data for transmission, synthesizing radio-frequency signals for transmission, and/or receiving and demodulating incident radio-frequency signals. RIS 50 may also be implemented without a display or user input device. In other words, the control circuitry on RIS 50 may adjust antenna elements 48 to direct and steer reflected wireless signals 46 without using antenna elements 48 to perform any data transmission or reception operations and without using antenna elements 48 to perform radio-frequency sensing operations. In other implementations, the RIS may include some active circuitry such as circuitry for demodulating received signals using the data RAT (e.g., to perform channel estimates for optimizing its reflection coefficients).

This may serve to minimize the hardware cost and power consumption of RIS 50. If desired, RIS 50 may also include one or more antennas (e.g., antennas separate from the antenna elements 48 used to reflect wireless signals 46) and corresponding transceiver/baseband circuitry that uses the one or more antennas to convey control signals with BS 34 or UE device 10 (e.g., using a control channel plane and control RAT). Such control signals may be used to coordinate the operation of RIS 50 in conjunction with BS 34 and/or UE device 10 but requires much lower data rates and thus much fewer processing resources and much less power than transmitting or receiving wireless signals 46. These control signals may, for example, be transmitted by UE device 10 and/or BS 34 to configure the phase and magnitude responses of antenna elements 48 (e.g., the control signals may convey beamforming coefficients). This may allow the calculation of phase and magnitude responses for antenna elements 48 to be offloaded from RIS 50, further reducing the processing resources and power required by RIS 50. In other implementations, RIS 50 may be a self-controlled RIS that includes processing circuitry for generating its own phase and magnitude responses and/or for coordinating communications among multiple UE devices (e.g., in a RIS-as-a-service configuration).

In this way, RIS 50 may help to relay wireless signals 46 between BS 34 and UE device 10 when object 31 blocks the LOS path between BS 34 and UE device 10 and/or when the propagation conditions from BS 34 to RIS 50 and from RIS 50 to UE device 10 are otherwise superior to the propagation conditions from BS 34 to UE device 10. Just a single RIS 50 may, for example, increase signal-to-interference-plus-noise ratio (SINR) for UE device 10 by as much as +20 dB and may increase effective channel rank relative to environments without an RIS. At the same time, RIS 50 may include only the processing resources and may consume only the power required to perform control procedures, minimizing the cost of RIS 50 and maximizing the flexibility with which RIS 50 can be placed within the environment.

RIS 50 may include or store a codebook (sometimes referred to herein as a RIS codebook) that maps settings for antenna elements 48 to different reflected signal beams formable by antenna elements 48 (sometimes referred to herein as RIS beams). RIS 50 may configure its own antenna elements 48 to perform beamforming with respective beamforming coefficients (e.g., as given by the RIS codebook). The beamforming performed at RIS 50 may include two concurrently active RIS beams (e.g., where each RIS beam is generated using a corresponding set of beamforming coefficients).

In general, RIS 50 may relay (reflect) signals between two different devices. RIS 50 may form a first active RIS beam that has a beam pointing direction oriented towards the first device (sometimes referred to here as a RIS-BS beam when the first device is BS 34) and may concurrently form a second active RIS beam that has a beam pointing direction oriented towards the second device (sometimes referred to herein as a RIS-UE beam when the second device is UE device 10). In this way, when wireless signals 46 are incident from the first device (e.g., BS 34) within the first RIS beam, the antenna elements 48 on RIS 50 may receive the wireless signals incident from the direction the first device (e.g., BS 34) and may re-radiate (e.g., effectively reflect) the incident wireless signals within the second RIS beam and towards the direction of the second device (e.g., UE device 10). Conversely, when wireless signals 46 are incident from the second device (e.g., UE device 10) within the second RIS beam, the antenna elements 48 on RIS 50 may receive the wireless signals incident from the direction the second device (e.g., UE device 10) and may re-radiate (e.g., effectively reflect) the incident wireless signals within the first RIS beam and towards the direction of the first device (e.g., BS 34). If desired, the first and second RIS beams may be oriented in the same direction to reflect incident signals back in the direction the signals were received from.

While referred to herein as "beams," the RIS beams formed by RIS 50 do not include signals/data that are actively transmitted by RIS 50 but instead correspond to the impedance, phase, and/or magnitude response settings (e.g., reflection coefficients) for antenna elements 48 that shape the reflected signal beam of wireless signals 46 from a corresponding incident direction/angle onto a corresponding output direction/angle (e.g., one RIS beam may be effectively formed using a first set of beamforming coefficients whereas another RIS beam may be effectively formed using a second set of beamforming coefficients).

Figure 2:
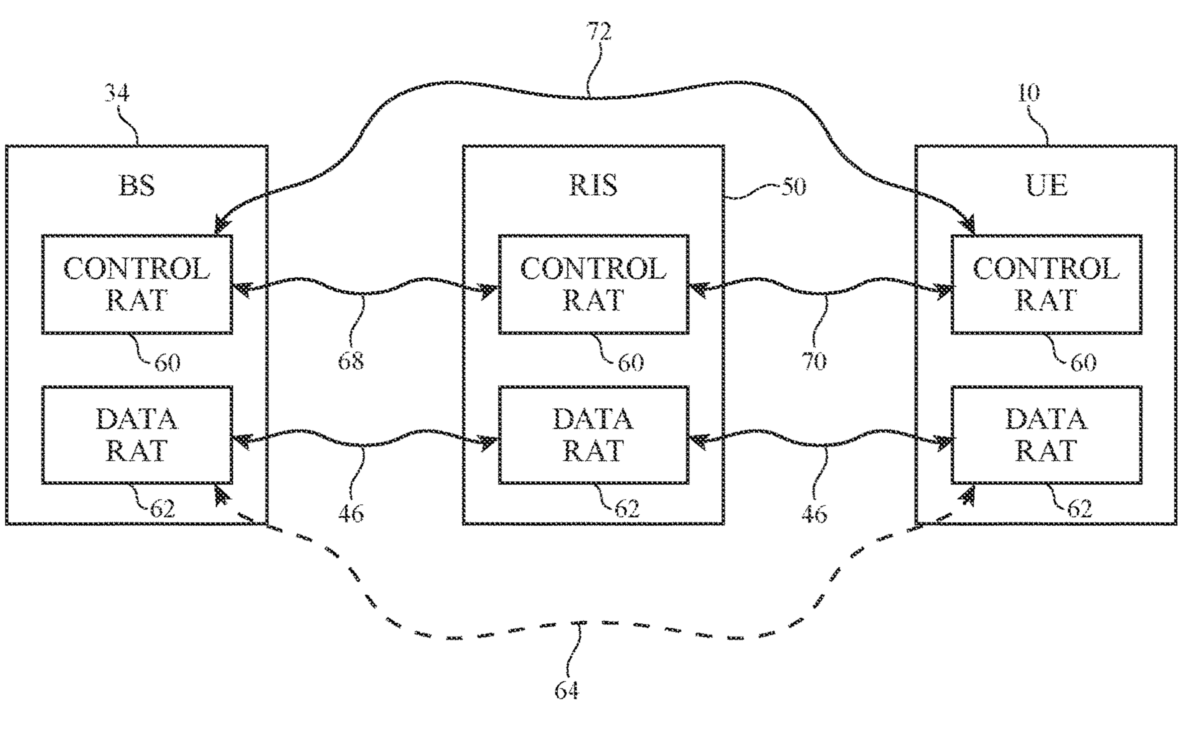
FIG. 2 is a diagram showing how an illustrative wireless base station, RIS, and UE device may communicate using both a data transfer radio access technology (RAT) and a control RAT in accordance with some embodiments.

FIG. 2 is a diagram showing how BS 34, RIS 50, and UE device 10 may communicate using both a control RAT and a data transfer RAT for establishing and maintaining communications between BS 34 and UE device 10 via RIS 50. As shown in FIG. 2, BS 34, RIS 50, and UE device 10 may each include wireless circuitry that operates according to a data transfer RAT 62 (sometimes referred to herein as data RAT 62) and a control RAT 60. Data RAT 62 may be a sub-THz communications RAT such as a 6G RAT that performs wireless communications at the frequencies of wireless signals 46. Control RAT 60 may be associated with wireless communications that consume much fewer resources and are less expensive to implement than the communications of data RAT 62. For example, control RAT 60 may be Wi-Fi, Bluetooth, a cellular telephone RAT such as a 3G, 4G, or 5G NR FR1 RAT, etc. As another example control RAT 60 may be an infrared communications RAT (e.g., where an infrared remote control or infrared emitters and sensors use infrared light to convey signals for the control RAT between UE device 10, BS 34, and/or RIS 50).

BS 34 and RIS 50 may use control RAT 60 to convey radio-frequency signals 68 (e.g., control signals) between BS 34 and RIS 50. UE device 10 and RIS 50 may use control RAT 60 to convey radio-frequency signals 70 (e.g., control signals) between UE device 10 and RIS 50. UE device 10, BS 34, and RIS 50 may use data RAT 62 to convey wireless signals 46 via reflection off antenna elements 48 of RIS 50. The wireless signals may be reflected, via the first RIS beam and the second RIS beam formed by RIS 50, between BS 34 and UE device 10. BS 34 may use radio-frequency signals 68 and control RAT 116 and/or UE device 10 may use radio-frequency signals 70 and control RAT 116 to discover RIS 50 and to configure antenna elements 48 to establish and maintain the relay of wireless signals 32 performed by antenna elements 48 using data RAT 62.

If desired, BS 34 and UE device 10 may also use control RAT 60 to convey radio-frequency signals 72 directly with each other (e.g., since the control RAT operates at lower frequencies that do not require line-of-sight). UE device 10 and BS 34 may use radio-frequency signals 72 to help establish and maintain THF communications (communications using data RAT 62) between UE device 10 and BS 34 via RIS 50. BS 34 and UE device 10 may also use data RAT 62 to convey wireless signals 46 directly (e.g., without reflection off RIS 50) when a LOS path is available.

If desired, the same control RAT 60 may be used to convey radio-frequency signals 68 between BS 34 and RIS 50 and to convey radio-frequency signals 70 between RIS 50 and UE device 10. If desired, BS 34, RIS 50, and/or UE device 10 may support multiple control RATs 60. In these scenarios, a first control RAT 60 (e.g., Bluetooth) may be used to convey radio-frequency signals 68 between BS 34 and RIS 50, a second control RAT 60 (e.g., Wi-Fi) may be used to convey radio-frequency signals 70 between RIS 50 and UE device 10, and/or a third control RAT 60 may be used to convey radio-frequency signals 72 between BS 34 and UE device 10. Processing procedures (e.g., work responsibilities) may be divided between data RAT 62 one or more control RAT 60 during discovery, initial configuration, data RAT communication between UE device 10 and BS 34 via RIS 50, and beam tracking of UE device 10.

Figure 3:
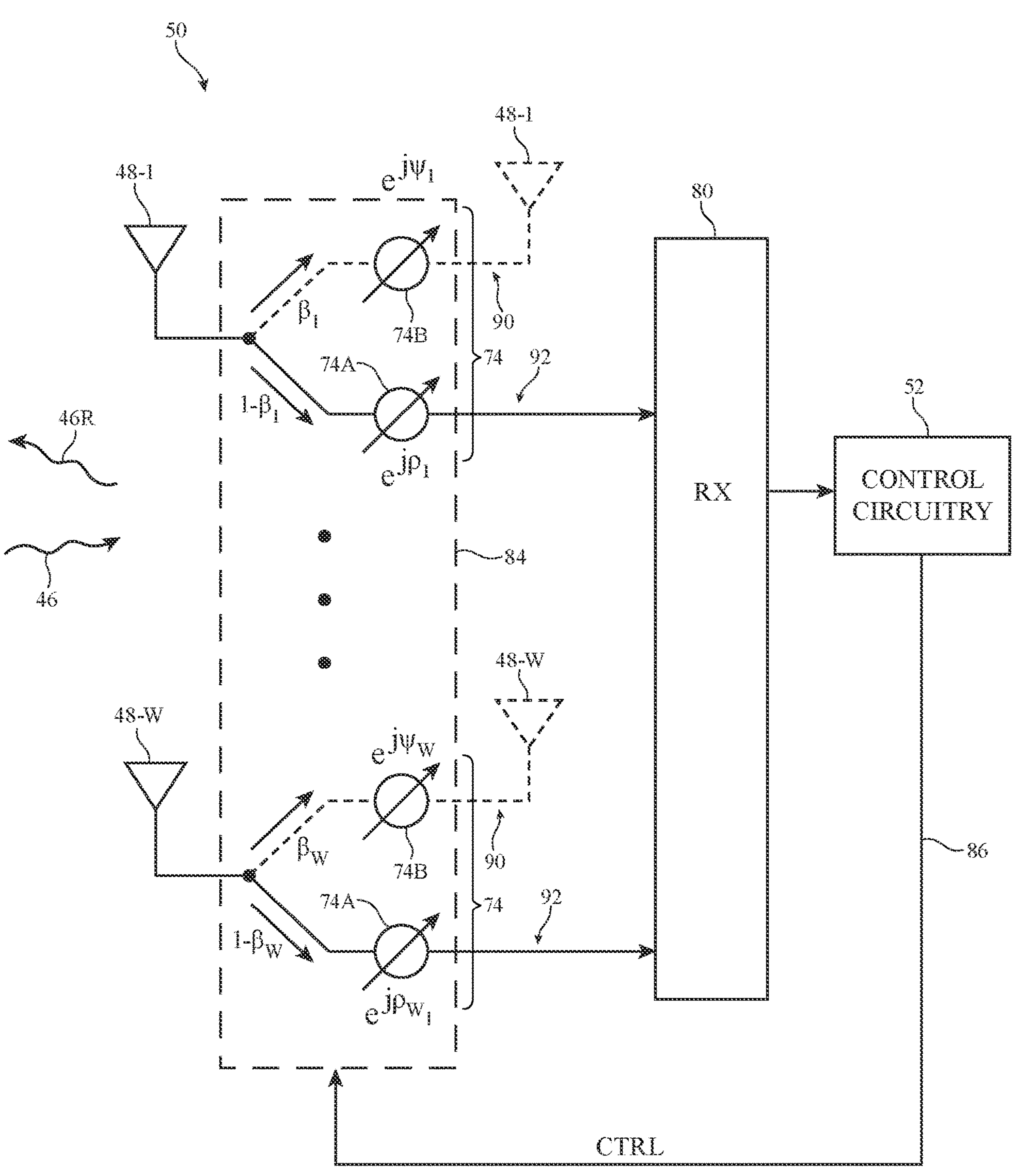
FIG. 3 is a circuit schematic diagram of an illustrative hybrid RIS in accordance with some embodiments.

FIG. 3 is a diagram of RIS 50. As shown in FIG. 3, RIS 50 may include a set of W antenna elements 48 (e.g., patches or other structures formed from metal or metamaterials/metastructures on an underlying substrate). The W antenna elements 48 may be arranged in an array pattern (e.g., having sub-wavelength spacing). The antenna elements 48 on RIS 50 may have sub-wavelength spacing and may each have a sub-wavelength width/size. The array pattern may have rows and columns. Other array patterns may be used if desired. Each antenna element 48 may be coupled to a corresponding adjustable device 74. Adjustable devices 74 may include, as one example, a diode switch. Each adjustable device 74 and its corresponding antenna element 48 may sometimes be referred to herein as a unit cell of RIS 50 (e.g., RIS 50 may have W unit cells).

Control circuitry 52 may provide control signals CTRL (e.g., a variable voltage) to radio-frequency circuitry 84 over control path(s) 86. Radio-frequency circuitry 84 may include adjustable devices 74, impedance matching circuitry, and/or any other desired circuitry for adjusting the complex impedance and thus the reflection coefficients of antenna elements 48. For example, each adjustable device 74 may be configured (using control signal CTRL) to impart a respective selected impedance to its corresponding antenna element 48. The impedance may effectively impart a corresponding phase shift to incident wireless signals 46 that are scattered (e.g., re-radiated or effectively reflected) by the antenna element. Adjustable devices 74 may therefore sometimes be referred to herein as phase shifters 74. Control signals CTRL may control each phase shifter 74 to exhibit a corresponding phase setting. Each phase setting may cause the antenna element 48 to impart a corresponding phase shift to the wireless signals 46 scattered (reflected) by the antenna element for data RAT 62 (as reflected signals 46R). Put differently, each phase setting may configure the corresponding antenna element 48 to exhibit a particular reflection coefficient or impedance for incident signals. By selecting the appropriate settings (phase shift settings or applied phase shifts) for phase shifters 74, the array of antenna elements 48 may be configured to form RIS beams in different directions (e.g., to reflect/scatter wireless signals incident from incident angles associated with a first RIS beam onto corresponding output angles associated with a second RIS beam).

If desired, RIS 50 may have one or more antennas that are dedicated to performing communications over control RAT 60 (not shown). Such antennas may be omitted from RIS 50 if desired.

If desired, control circuitry 52 may store a codebook that maps different sets of settings (e.g., phase settings) for phase shifters 74 to different input/output/reflected angles (e.g., to different combinations of first and second RIS beams for RIS 50). The codebook may be populated during manufacture, deployment, calibration, and/or regular operation of RIS 50. If desired, BS 34 (FIG. 1) and/or UE device 10 may use control RAT 60 to populate or update the entries of the codebook. During operation, UE device 10 and/or BS 34 may control RIS 50 to configure (program) phase shifters 74 to form the RIS beams necessary for RIS 50 to reflect wireless signals 46 from a desired incident direction onto a desired output direction, which may change over time. This may involve selection (calculation) of the appropriate set of phase settings (e.g., imparted phase shifts) for phase shifters 74 to form the RIS beams.

In implementations that are described herein as an example, RIS 50 may include some active circuitry that is used to receive and demodulate wireless data from incident wireless signals 46 received under the data RAT. In these implementations, RIS 50 may sometimes be referred to as a hybrid RIS (HRIS) 50. As shown in FIG. 3, when implemented as an HRIS, control circuitry 52 may include transceiver circuitry such as one or more receivers (RX) 80. Antenna elements 48 may receive incident wireless signals 46 using the data RAT and may pass the received wireless signals to receiver 80. Each antenna element 48 in HRIS 50 may be coupled to receiver 80 (e.g., over one or more radio-frequency transmission line paths 92) or, if desired, HRIS 50 may include a first set of antenna elements 48 that are coupled to receiver 80 and capable of receiving signals and a second set of antenna elements 48 that are purely passive (e.g., that only reflect incident signals) and that are not coupled to receiver 80. HRIS 50 may also include transmitter circuitry (not shown) for transmitting wireless signals over antenna elements 48 using the data RAT. If desired, the transmitter circuitry may be offloaded to UE device 10 and may be coupled to antenna elements 48 over a radio-frequency interface.

Receiver 80 may include mixer circuitry for downconverting the received signals to baseband frequencies. Receiver 80 may include analog-to-digital converter circuitry for converting the signals to the digital domain. Receiver 80 may include demodulation circuitry that demodulates (decodes) wireless data from the received signals. If desired, receiver 80 may include L chains of receiver circuitry (sometimes referred to herein as receive chains, where L is an integer less than W) each coupled to a respective antenna element 48. In these implementations, analog adder circuitry may be used to couple each antenna element 48 to each receive chain (e.g., adders may be used to add the received signal from each antenna element 48 together and then to provide the added signal to the corresponding receive chain). Receiver 80 may include circuitry that generates wireless performance metric data characterizing the received signals (e.g., signal-to-noise ratio (SNR) values, received power levels, reference signal received power (RSRP) values, signal quality values, error rate values, etc.). Receiver 80 and/or control circuitry 52 may process the wireless performance metric data for use in performing beam forming if desired. In this way, HRIS 50 may consume slightly more power in order to gain both reflect and receive wireless signals 46.

HRIS 50 may be co-located with UE device 10. This means that HRIS 50 may be disposed within the same reference frame as UE device 10 (e.g., may be disposed on or within UE device 10). When HRIS 50 is disposed in the same reference frame as UE device 10, any movement or rotation of UE device 10 (e.g., within up to six degrees of freedom about/along three translational and three rotational axes) will also produce the same movement or rotation on HRIS 50. When HRIS 50 is co-located with UE device 10, HRIS 50 may help to facilitate beam acquisition and beam tracking procedures between UE device 10 and BS 34 in a manner that reduces resource (e.g., power) consumption at UE device 10. HRIS 50 may be owned, controlled, and/or operated by the end user of UE device 10 (rather than by the wireless network or service provider). UE device 10 may transmit wired and/or wireless control signals to HRIS 50 that configure the phase shifters 74 in HRIS 50 to exhibit desired phase shift values (e.g., for forming desired RIS beams). UE device 10 may transmit the control signals to control circuitry 52 or, if desired, some or all of control circuitry 52 may be disposed on or offloaded onto UE device 10. The example of FIG. 3 in which receiver 80 is depicted within HRIS 50 is illustrative and non-limiting. If desired, receiver 80 may be disposed within UE device 10 (e.g., external to HRIS 50) and may be coupled to the antenna elements 48 on HRIS 50 via one or more wired and/or wireless links (e.g., a radio-frequency interface including radio-frequency transmission line paths, radio-frequency connectors, etc.).

The antenna elements 48 in HRIS 50 may reflect incident wireless signals 46 as reflected signals 46R while concurrently (simultaneously) passing the incident wireless signals 46 to receiver 80 for decoding (a process that is sometimes referred to herein simply as receiving the wireless signals). In other words, HRIS 50 may concurrently receive and reflect incident wireless signals 46. The phase shifts imparted by phase shifters 74 to the received wireless signals are coupled with the phase shifts imparted by the phase shifters to the reflected wireless signals. In other words, the phase shift provided by a given phase shifter 74 to signal received by its corresponding antenna element 48 determines the phase shift imparted by that phase shifter the signal reflected by its corresponding antenna element 48 according to a known or unknown function (e.g., the phase shift imparted to the reflected signal is a function fo the phase shift imparted to the received signal and vice versa).

FIG. 3 models this phase shift coupling. As shown in FIG. 3, each antenna element 48 may be coupled to receiver 80 over a corresponding radio-frequency signal path 92. The physical circuitry that forms phase shifter 74 may be disposed on radio-frequency signal path 92.

Each antenna element 48 may receive an incident wireless signal 46. The incident wireless signal 46 may be split between radio-frequency signal path 92 and reflection by antenna element 48. For example, a first portion of the incident wireless signal 46 (e.g., a first portion of the power of the incident signal) may be received by receiver 80 via radio-frequency signal path 92. At the same time, a second portion of the incident wireless signal 46 (e.g., a second portion of the power of the incident signal) may be reflected by antenna element 48 as reflected signal 46R, which is effectively shown by modeled paths 90. The proportion of the incident wireless signal 46 that is reflected by the wth antenna element 48 may be characterized by a constant $\beta_w$ that is between 0 and 1.0 (e.g., constant $\beta_1$ for antenna element 48-1, constant $\beta_w$ for antenna element 48-W, etc.). The proportion of the incident wireless signal 46 that is received by receiver 80 may therefore be characterized by the constant $1-\beta$ (e.g., constant $1-\beta_1$ for antenna element 48-1, constant $1-\beta_W$ for antenna element 48-W, etc.).

Since the incident wireless signal 46 encounters the same impedance at phase shifter 74 regardless of whether the wireless signal 46 is reflected or received, the phase shifter 74 coupled to each antenna element 48 imparts coupled phase shifts to the received and reflected signals. As such, each phase shifter 74 effectively forms a first phase shifter 74A on radio-frequency signal path 92 for imparting a first phase shift to the received signal and a second phase shifter 74B on the corresponding modeled path 90 for imparting a second phase shift to the reflected signal (where the second phase shift is coupled with the first phase shift). In other words, the phase shifter 74A on radio-frequency signal path 92 for the wth antenna element 48 may impart a first phase shift $\rho_w$ to the received signal (e.g., a phase shift of $\rho_1$ for antenna element 48-1, a phase shift of $\rho_w$ for antenna element 48-W, etc.). The phase shifter 74B on modeled path 90 for the wth antenna element 48 may impart a second phase shift $\psi$ to the reflected signal (e.g., a phase shift of $\psi_1$ for antenna element 48-1, a phase shift of $\psi_w$ for antenna element 48-W, etc.). Since the first and second phase shifts for each antenna element 48 are coupled, phase shift $\rho_w$ is fully determined by the corresponding phase shift $\psi_w$ and vice versa (e.g., $\psi_w$ is a function of $\rho_w$ and $\rho_w$ is a function of $\psi_w$). If a particular phase shift $\psi_w$ is chosen to reflect the incident signal in a desired direction, the phase shift $\rho_w$ may either be known or unknown. Conversely, if a particular phase shift $\rho_w$ is chosen to receive the incident signal from a desired direction, the phase shift T, may either be known or unknown.

Due to this coupling between phase shifts for the reflected signal and the received signal, the phase shifter 74 for a given antenna element 48 may be configured using a setting (e.g., configured to impart an impedance by control signal CTRL) that optimizes only one of signal reception or signal reflection at a given time (e.g., the impedance of the phase shifter may be set to maximize or minimize incident signal reflection). An antenna element 48 that has a phase shifter 74 configured to optimize the received signal may sometimes be referred to herein as an antenna element in the RX state (e.g., where its phase shifter 74 maximizes the amount of incident signal passed to receiver 80 while reflecting as little of the signal as possible, essentially minimizing the reflection coefficient of the antenna element). An antenna element 48 that has a phase shifter 74 configured to optimize the reflected signal may sometimes be referred to herein as an antenna element in the reflect state (e.g., where its phase shifter 74 minimizes the amount of incident signal passed to receiver 80 while maximizing the amount of the signal that is reflected, essentially maximizing the reflection coefficient of the antenna element). Control circuitry 52 may use control signal CTRL to adjust or switch a given antenna element 48 between the reflect state, the receive state, and/or other states over time.

If desired, control circuitry 52 may also use the control signals CTRL provided to radio-frequency circuitry 84 to adjust the constant value p, for each of the W antenna elements 48 on HRIS 50 (e.g., where index w=1, . . . , W). For example, UE device 10 may control HRIS 50 to place the antenna elements 48 on HRIS 50 in the RX state to optimize signal reception (e.g., to perform RX-centric beam forming). In other words, control circuitry 52 may choose a constant $\beta_w$ for each of the W antenna elements 48 that collectively form an optimal set of phase shifts for a receive beamforming (BF) vector of HRIS 50. The set of phase shifts may, for example, be the phase shifts that cause receiver 80 to gather optimal wireless performance metric data (e.g., peak SNR or RSRP) from the signal received using antenna elements 48.

Similarly, UE device 10 may control HRIS 50 to place the antenna elements 48 on HRIS 50 in the reflect state to optimize signal reflection (e.g., to perform reflect-centric beam forming). In other words, UE device 10 may choose a constant $\beta_w$ for each of the W antenna elements 48 that collectively form an optimal set of phase shifts for a reflect beamforming (BF) vector of HRIS 50. The reflected signal may be received back at the transmitting device (e.g., BS 34). In this example, BS 34 may be provided with a radar transmitter that transmits radar signals in wireless signals 46. BS 34 may include a radar receiver co-located with the transmitter that receives the reflected signal from HRIS 50. BS 34 may gather wireless performance metric data from the reflected signal. The set of phase shifts may, for example, be the phase shifts that cause BS 34 to gather optimal wireless performance metric data (e.g., peak SNR or RSRP) from the reflected signal. UE device 10 may control HRIS 50 to allocate its time, space, and/or power resources between RX-centric and reflect-centric beam forming. Control signal CTRL setting constant $\beta_w$ may also determine the imparted phase shifts $\psi_w$ and $\rho_w$ for that antenna element 48 (and vice versa). For example, control signal CTRL may configure the impedance matching circuitry (e.g., a varactor or other component) in radio-frequency circuitry 84 that is coupled to a given antenna element 48 to impart that antenna element 48 with a selected complex impedance (and thus with a selected complex reflection coefficient). That complex impedance may cause the antenna element 48 to split power between the reflected signal and the received signal according to constant $\beta_w$ while also imparting the reflected signal with phase shift $\psi_w$ and imparting the received signal with phase shift $\rho_w$. Using control signal CTRL to adjusting the impedance would then adjust constant $\beta_w$, phase shift $\psi_w$, and phase shift $\rho_w$.

Figure 4:
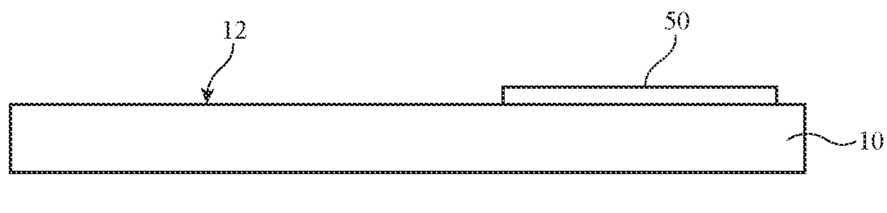
FIG. 4 is a cross-sectional side view showing how an illustrative hybrid RIS may be layered onto the housing of a UE device in accordance with some embodiments.

FIG. 4 is a cross-sectional side view showing one example of how HRIS 50 may be layered onto UE device 10. As shown in FIG. 4, HRIS 50 may be layered onto an external surface of the housing 12 for UE device 10 (e.g., onto a rear housing wall, a housing sidewall, or a cover layer for device 10). HRIS 50 may be adhered to housing 12 using adhesive or may be attached or affixed to housing 12 using any desired attachment structures (e.g., clips, screws, welds, solder, brackets, a bezel, etc.). If desired, HRIS 50 may be removable from housing 12. For example, an end user of UE device 10 may purchase an HRIS 50 and may attach HRIS 50 to their UE device to support UE device 10 during data RAT communications. The end user may remove HRIS 50 from housing 12 when desired. In other implementations, HRIS 50 may be permanently affixed to housing 12.

Figure 5:
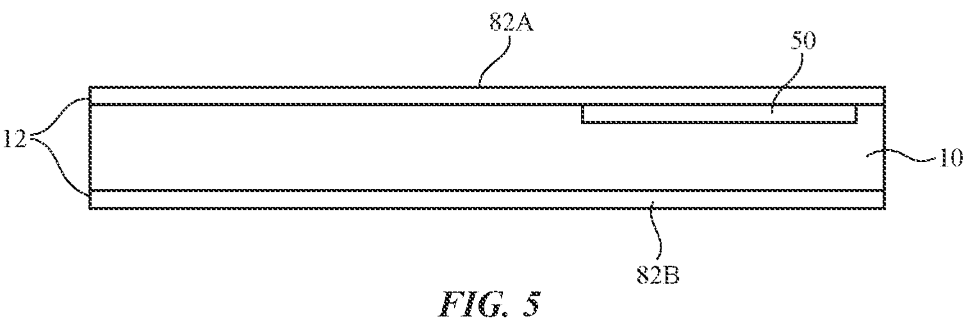
FIG. 5 is a cross-sectional side view showing how an illustrative hybrid RIS may be disposed within the housing of a UE device in accordance with some embodiments.

FIG. 5 is a cross-sectional side view showing one example of how HRIS 50 may be integrated into UE device 10 itself. As shown in FIG. 5, housing 12 of UE device 10 may include dielectric cover layers such as at least a first dielectric cover layer 82A and a second dielectric cover layer 82B opposite the first dielectric cover layer. Dielectric cover layer 82A may include a rear housing wall for UE device 10 or a transparent display cover layer for the display of UE device 10, as examples. HRIS 50 may be layered onto an internal surface of dielectric cover layer 82A (e.g., using adhesive or other attachment structures). In other implementations, HRIS 50 may be molded within, integrated into, or otherwise embedded or disposed within dielectric cover layer 82A itself. In still other implementations, HRIS 50 may be layered onto any desired structures within the interior of UE device 10. If desired, HRIS 50 may be assembled within UE device 10 during device assembly or manufacture and prior to receipt of UE device 10 by an end user.

In the examples of FIGS. 4 and 5, UE device 10 and HRIS 50 are co-located within the same reference frame. In general, UE device 10 may be disposed at, in, on, and/or adjacent to UE device 10 such that UE device 10 and HRIS 50 are co-located within the same reference frame. When co-located in the same reference frame, UE device 10 and HRIS 50 will both move or rotate together overtime. When UE device 10 and HRIS 50 are co-located within the same reference frame, HRIS 50 may be used to facilitate beam acquisition and beam tracking procedures between UE device 10 and BS 34 in a manner that reduces resource (e.g., power, time, etc.) consumption at UE device 10.

In scenarios where UE device 10 communicates with BS 34 without an HRIS, UE device 10 and BS 34 may each need to actively transmit, receive, and process signals to select the optimal UE beam and the optimal BS beam to use for conveying wireless data using the data RAT, while also reporting the optimal beams to each other. This can consume an excessive amount of power and other resources on UE device 10 (thereby limiting battery life), can involve excessive communications overhead, and can consume an excessive amount of time. UE device 10 may utilize the co-located HRIS 50 to perform beam acquisition and beam tracking procedures in a manner that reduces resource (e.g., power) consumption and overhead at UE device 10.

Figure 6:
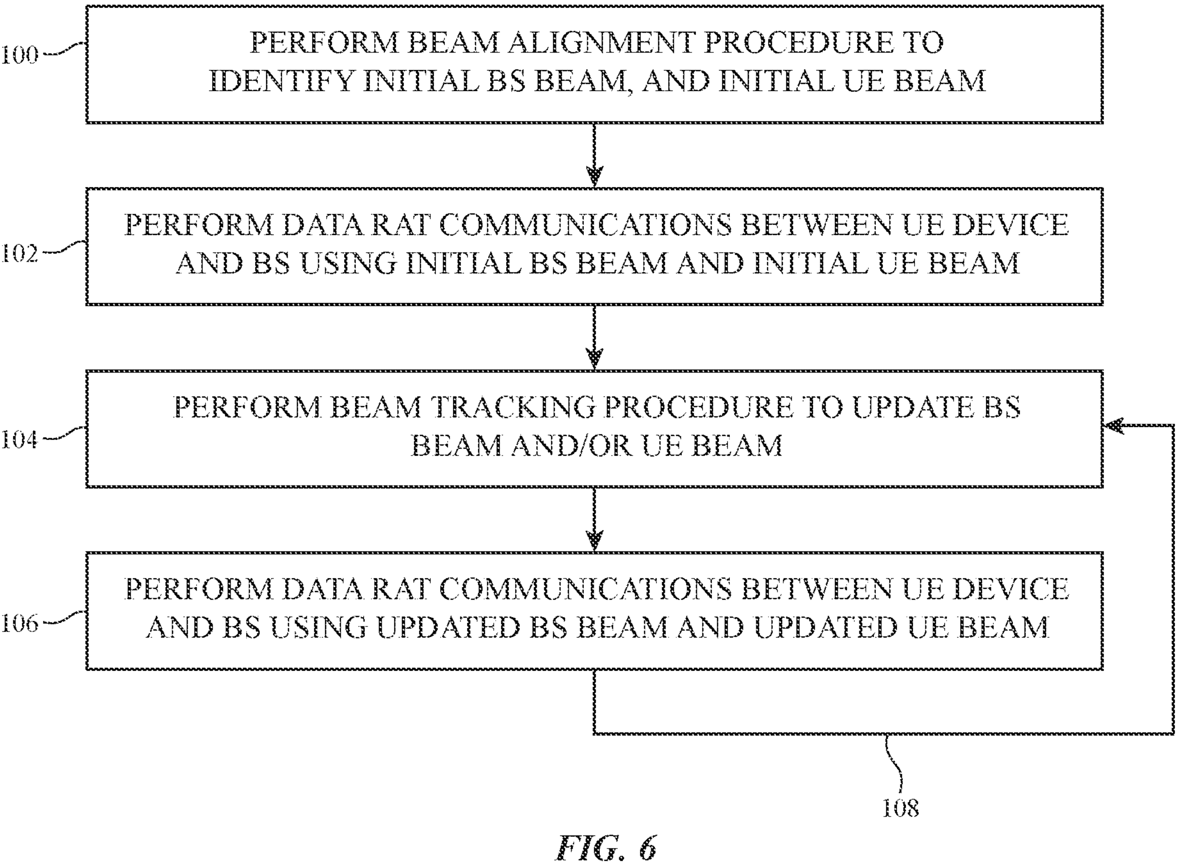
FIG. 6 is a flow chart of illustrative operations involved in performing wireless communications between a wireless base station and a UE device having a co-located hybrid RIS in accordance with some embodiments.

FIG. 6 is a flow chart of illustrative operations involved in performing wireless communications between a BS 34 and a UE device 10 having a co-located HRIS 50. While referred to herein as UE device 10 and a co-located HRIS 50, if desired, UE device 10 may also sometimes be referred to herein including HRIS 50. The operations of FIG. 6 may be performed once UE device 10 has entered the network and attempts to communicate with BS 34 (e.g., upon power on, upon entering a cell of BS 34, upon returning from a disconnected state, etc.).

At operation 100, UE device 10 and BS 34 may perform a beam alignment (BA) procedure using HRIS 50. The beam alignment procedure may serve to identify (e.g., select, generate, determine, produce, etc.) an initial BS beam of BS 34 that is oriented towards the location of UE device 10 (or that otherwise exhibits peak performance at UE device 10 given the RF propagation/channel conditions in the environment) and to identify an initial RIS beam of HRIS 50 that is oriented towards the location of BS 34 (or that otherwise exhibits peak performance at BS 34 given the RF propagation/channel conditions in the environment). Since UE device 10 is co-located with HRIS 50, UE device 10 may identify an initial UE beam of its own antennas 30 (FIG. 1) that is oriented towards the location of BS 34. The initial UE beam may, for example, be oriented in the same beam pointing direction as the identified initial RIS beam or may otherwise be determined based on the identified initial RIS beam and the predetermined orientation/position of UE device 10 relative to HRIS 50. If desired, UE device 10 may perform its data RAT communications using antenna elements 48 of HRIS 50 (e.g., rather than using a dedicated array of antennas on UE device 10 to perform data RAT communications). In these implementations, the initial UE beam and the initial RIS beam are the same. Utilizing HRIS 50 to perform the beam alignment procedure may serve to minimize resource consumption and overhead at UE device 10 when connecting to BS 34.

At operation 102, UE device 10 and BS 34 may perform data RAT communications using the initial BS beam and the initial UE beam. For example, UE device 10 may transmit uplink data to BS 34 using the initial UE beam and BS 34 may receive the uplink data using the initial BS beam, BS 34 may transmit downlink data to UE device 10 using the initial BS beam and UE device 10 may receive the downlink data using the initial UE beam, etc. UE device 10 may, for example, use transmitter circuitry coupled to the antenna elements 48 on HRIS 50 (e.g., transmitter circuitry in HRIS 50 or transmitter circuitry within UE device 10 but external to HRIS 50) to transmit the uplink data and may use receiver 80 on HRIS 50 to receive the downlink data.

At operation 104, UE device 10 and BS 34 may perform a beam tracking (BT) procedure using HRIS 50. Once an initial BS beam and an initial UE beam have been found (at operation 100), the beam tracking procedure may be used to update one or both of the beams to optimize wireless performance as conditions change overtime (e.g., as the channel/propagation conditions change, as UE device 10 moves or rotates, as BS 34 moves or rotates, as external objects block the LOS or leave the LOS between BS 34 and UE device 10, etc.). The beam tracking procedure may serve to identify (e.g., select, generate, determine, produce, etc.) an updated BS beam of BS 34 that is oriented towards the location of UE device 10 (or that otherwise exhibits peak performance at UE device 10 given the RF propagation/channel conditions in the environment) and to identify an updated RIS beam of HRIS 50 that is oriented towards the location of BS 34 (or that otherwise exhibits peak performance at BS 34 given the RF propagation/channel conditions in the environment). Since UE device 10 is co-located with HRIS 50, UE device 10 may identify an updated UE beam for its own antennas 30 that is oriented towards the location of BS 34. The updated UE beam may, for example, be oriented in the same beam pointing direction as the identified updated RIS beam or may otherwise be determined based on the identified updated RIS beam and the predetermined orientation/position of UE device 10 relative to HRIS 50. In implementations where UE device 10 performs its data RAT communications using antenna elements 48 of HRIS 50 (e.g., rather than using a dedicated array of antennas on UE device 10 to perform data RAT communications), the updated UE beam and the updated RIS beam are the same. Utilizing HRIS 50 to perform the beam tracking procedure may serve to minimize resource consumption and overhead at UE device 10 after UE device 10 has already connected to BS 34.

At operation 106, UE device 10 and BS 34 may perform data RAT communications using the updated BS beam and the updated UE beam. For example, UE device 10 may transmit uplink data to BS 34 using the updated UE beam and BS 34 may receive the uplink data using the updated BS beam, BS 34 may transmit downlink data to UE device 10 using the updated BS beam and UE device 10 may receive the downlink data using the updated UE beam, etc. UE device 10 may, for example, use transmitter circuitry coupled to the antenna elements 48 on HRIS 50 (e.g., transmitter circuitry in HRIS 50 or transmitter circuitry within UE device 10 but external to HRIS 50) to transmit the uplink data and may use receiver 80 on HRIS 50 to receive the downlink data. Processing may then loop back to operation 104 via path 108 to update the RIS, UE, and/or BS beams as the channel conditions and/or the relative position/orientation of UE device 10 and BS 34 change over time.

Figure 7:
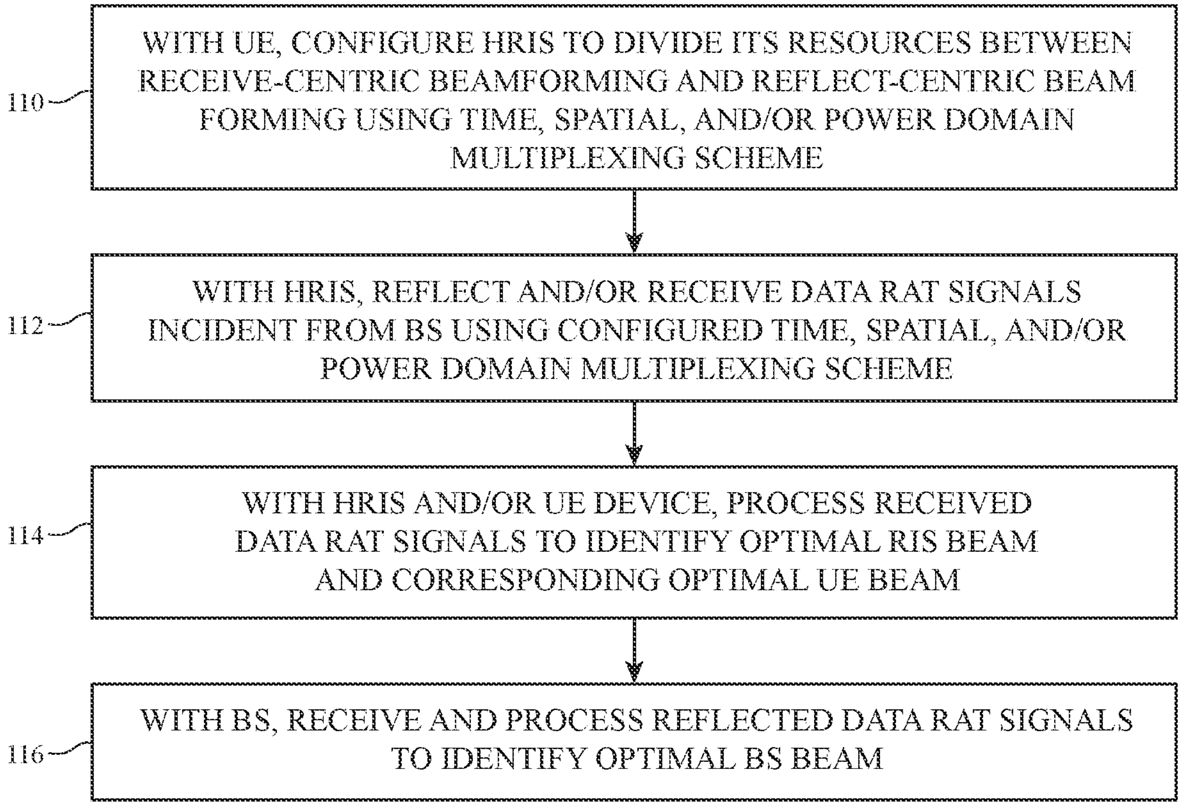
FIG. 7 is a flow chart of illustrative operations involved in using a hybrid RIS to perform beam acquisition or beam tracking while minimizing resource consumption for a co-located UE device in accordance with some embodiments.

FIG. 7 is a flow chart of illustrative operations involved in using HRIS 50 to identify an optimal BS beam and an optimal UE beam for performing data RAT communications. The optimal BS beam may be the initial BS beam identified during the beam alignment procedure in operation 100 of FIG. 6 or may be the updated BS beam identified during the beam tracking procedure in operation 104 of FIG. 6. Similarly, the optimal UE beam may be the initial UE beam identified during the beam alignment procedure in operation 100 of FIG. 6 or may be the updated UE beam identified during the beam tracking procedure in operation 104 of FIG. 6. In other words, the operations of FIG. 7 may be performed while processing operations 100 or 104 of FIG. 6.

At operation 110 of FIG. 7, UE device 10 may control HRIS 50 to divide its resources between receive-centric beamforming and reflect-centric beamforming using a time domain multiplexing scheme (sometimes referred to herein as a time division multiplexing scheme, time domain duplexing scheme, or time division duplexing scheme), a spatial domain multiplexing scheme (sometimes referred to herein as a space division multiplexing scheme, spatial domain duplexing scheme, or space division duplexing scheme), and/or a power domain multiplexing scheme (sometimes referred to herein as a power division multiplexing scheme, power domain duplexing scheme, or power division duplexing scheme). UE device 10 may control HRIS 50 via control signals transmitted to HRIS 50 over a wired and/or wireless control interface (e.g., a wired or wireless link between control circuitry 14 on UE device 10 and control circuitry 52 on HRIS 50). Control circuitry 52 on HRIS 50 may control radio-frequency circuitry 84 (e.g., phase shifters 74) based on the control signals received from UE device 10 (e.g., using control signals CTRL) to provide antenna elements 48 with corresponding reflection coefficients (e.g., impedances and thus constants $\beta_w$, phase shifts $\psi_w$, and phase shifts $\rho_w$) that implement the time, spatial, and/or power domain multiplexing scheme.

Under the time domain multiplexing scheme, the antenna elements 48 on HRIS 50 are provided with different settings (e.g., reflection coefficients) at different times to switch the antenna elements 48 between the RX state (e.g., while phase shifters 74 are provided with settings and thus impedances or reflection coefficients that optimize signal reception for performing receive-centric beamforming) and the reflect state (e.g., while phase shifters 74 are provided with settings and thus impedances or reflection coefficients that optimize signal reflection for performing reflect-centric beamforming). Under the spatial domain multiplexing scheme, a first set of antenna elements 48 on HRIS 50 is placed in the RX state (e.g., configured to exhibit reflection coefficients that optimize signal reception for performing receive-centric beamforming) while a second set of antenna elements 48 on HRIS 50 is concurrently placed in the reflect state (e.g., configured to exhibit reflection coefficients that optimize signal reflection for performing reflect-centric beamforming). Under the power domain multiplexing scheme, each antenna element 48 splits power between the reflected and received signal by a different respective amount at the same time. Combinations of these schemes may be used if desired (e.g., different sets of antennas may be placed in the RX state or reflect state at different times and/or may divide power differently at different times).

At operation 112, BS 34 may transmit wireless signals 46 using the data RAT. At least some of the wireless signals 46 (sometimes referred to herein as data RAT signals) may be incident upon HRIS 50. HRIS 50 may reflect and/or receive the incident wireless signals 46 using the configured time, spatial, and/or power domain multiplexing scheme. At least some of the reflected signals may be directed back towards BS 34 and may be received by BS 34.

At operation 114, control circuitry 52 on HRIS 50 and/or control circuitry 14 on UE device 10 may process the wireless signals 46 received by antenna elements 48 and receiver 80 on HRIS 50 to identify (e.g., select, determine, generate, output, etc.) an optimal RIS beam for HRIS 50 (and thus an optimal UE beam for UE device 10). The amount of the incident signals received by receiver 80 may depend on the direction of the RIS beam (e.g., may depend on the impedances of the antenna elements 48 in the RX state) and the direction of the BS beam during transmission. Receiver 80 may gather first wireless performance metric data from the received signals. The first wireless performance metric data may characterize how much of the wireless signals 46 transmitted by BS 34 are received at HRIS 50 (and thus the co-located UE device 10). As such, the first wireless performance metric data may characterize the alignment between the BS beam and the RIS beam (e.g., the orientation of the BS beam towards HRIS 50 and the orientation of the RIS beam towards BS 34).

The control circuitry may identify which of the RIS beams (UE beams) is the optimal RIS (UE) beam based on the first wireless performance metric data. For example, the control circuitry may perform one or more beam sweeps over the set of RIS beams formable by HRIS 50 while HRIS 50 continues to receive data RAT signals from BS 34. Receiver 80 may gather the first wireless performance metric data while the HRIS 50 forms each of the RIS beams in the sweep. The control circuitry may identify (select) the RIS beam that produced the optimal or peak wireless performance metric data (e.g., peak SNR or RSRP) from the first wireless performance metric data as the optimal RIS (UE) beam. The optimal RIS beam may be the RIS beam oriented in the direction of BS 34 or the RIS beam that otherwise produced the best wireless performance metric data under the current channel conditions.

The control circuitry may then identify the optimal UE beam based on the optimal RIS beam. For example, the control circuitry may identify the beam pointing direction of the optimal RIS beam, which also corresponds to the angle of arrival (AoA) of the wireless signals 46 that produced the optimal wireless performance metric data. The control circuitry may then select, as the optimal UE beam, the UE beam from the set of UE beams formable by UE device 10 that corresponds to the optimal RIS beam. The optimal UE beam may, for example, have the same beam pointing direction (AoA) as the optimal RIS beam or may be calculated based on the known relative position/orientation between UE device 10 and HRIS 50. In implementations where UE device 10 performs its data RAT communications using antenna elements 48 of HRIS 50 (e.g., rather than using a dedicated array of antennas on UE device 10 to perform data RAT communications), the optimal UE beam and the optimal RIS beam are the same. UE device 10 may then use the optimal UE beam as the initial UE beam at operation 102 or the updated UE beam at operation 106 of FIG. 6.

Operation 116 may be performed prior to, concurrent with, and/or after operation 114. At operation 116, BS 34 may receive the reflected signals from HRIS 50. The amount of the reflected signals received by BS 34 may depend on the direction of the RIS beam (e.g., may depend on the impedances of the antenna elements 48 in the reflect state), the direction of the BS beam, and the selected reflect/receive multiplexing scheme. BS 34 may gather second wireless performance metric data from the received reflected signals. The second wireless performance metric data may characterize how much of the transmitted wireless signals 46 reached HRIS 50 and how much of those wireless signals were reflected back towards and received by BS 34, for example. As such, the second wireless performance metric data may characterize the alignment between the BS beam and the RIS beam (e.g., the orientation of the BS beam towards HRIS 50 and the orientation of the RIS beam towards BS 34).

The control circuitry on BS 34 may identify which of the BS beams is the optimal BS beam based on the second wireless performance metric data. For example, the control circuitry may perform one or more beam sweeps over the set of BS beams formable by BS 34 and/or may form a single low-gain low-directivity BS beam while BS 34 continues to transmit wireless signals 46 and continues to receive reflected signals from HRIS 50.

BS 34 may gather the second wireless performance metric data while BS 34 forms each of the BS beams in the sweep. The control circuitry may identify (select) the BS beam that produced the optimal or peak wireless performance metric data (e.g., peak SNR or RSRP) from the second wireless performance metric data as the optimal BS beam. The optimal BS beam may be the BS beam oriented in the direction of HRIS 34 and thus UE device 10 or the BS beam that otherwise produced the best wireless performance metric data under the current channel conditions. BS 34 may then use the optimal BS beam as the initial BS beam at operation 102 or the updated BS beam at operation 106 of FIG. 6.

In this way, BS 34 may identify the optimal BS beam from its transmitted wireless signals 46 and the reflected signals received from HRIS 50 (e.g., using a radio detection and ranging (radar) scheme), without any active signal reception or measurement at UE device 10 and without requiring signaling overhead between BS 34 and UE device 10. This may serve to minimize the resources (e.g., power, processing resources, communications overhead, etc.) consumed by UE device 10 in performing the beam alignment procedure (at operation 100 of FIG. 6) and in performing the beam tracking procedure (at operation 106 of FIG. 6).

In FIGS. 8-10, shaded antenna elements 48 represent antenna elements in HRIS 50 that are in the RX state, having corresponding phase shifters 74 (e.g., phase shifters 74A or other components in radio-frequency circuitry 84 of FIG. 3) that impart a set of reflection coefficients (e.g., impedances) that is selected to optimize receipt of wireless signals 46 (e.g., for performing RX-based beam forming). On the other hand, unshaded antenna elements 48 represent antenna elements in HRIS 50 that are in the reflect state, having corresponding phase shifters 74 (e.g., phase shifters 74B or other components in radio-frequency circuitry 84 of FIG. 3) that impart a set of reflection coefficients (e.g., impedances) that is selected to optimize reflection of wireless signals 46 (e.g., for performing reflect-based beam forming).

FIG. 8 is a diagram showing one example of a time domain multiplexing scheme that may be implemented by HRIS 50 (e.g., while performing operation 112 of FIG. 7 and as configured by UE device 10 at operation 110 of FIG. 7). As shown in FIG. 8, wireless signals 46 may be incident upon HRIS 50 within a series of N consecutive time slots. During a first set of time slots 120 (e.g., a first half of the N time slots), HRIS 50 may place some or all of its antenna elements 48 in the RX state.

Receiver 80 may thereby receive the wireless signals 46 incident upon antenna elements 48 during the first set of time slots 120. Receiver 80 may, for example, gather the first wireless performance metric data from the wireless signals 46 received by HRIS 50 during this time period (e.g., while processing operation 114 of FIG. 7, for performing the beam alignment procedure at operation 100 or the beam tracking procedure at operation 104 of FIG. 6).

During a second set of time slots 122 (e.g., a second half of the N time slots), HRIS 50 may place some or all of its antenna elements 48 in the reflect state. Antenna elements 48 may thereby reflect incident wireless signals 46 during the second set of time slots 122. Receiver 80 may be powered down, may be powered off, may be asleep, may be inactive, or otherwise may not actively receive signals during this time period, thereby minimizing power consumption on HRIS 50. BS 34 may receive at least some of the reflected wireless signals. BS 34 may, for example, gather the second wireless performance metric data from the reflected wireless signals 46 received at BS 34 during this time period (e.g., while processing operation 116 of FIG. 7, for performing the beam alignment procedure at operation 100 or the beam tracking procedure at operation 104 of FIG. 6). If desired, the second set of time slots 122 may be interspersed (interleaved) with the first set of time slots 120.

FIG. 9 is a diagram showing one example of a spatial domain multiplexing scheme that may be implemented by HRIS 50 (e.g., while performing operation 112 of FIG. 7 and as configured by UE device 10 at operation 110 of FIG. 7). As shown in FIG. 9, a first set of antenna elements 48A on HRIS 50 may be place in the RX state (e.g., during each of the N time slots). Concurrently, a second set of antenna elements 48B on HRIS 50 may be placed in the reflect state (e.g., during each of the N time slots).

Receiver 80 may thereby receive the wireless signals 46 incident upon the first set of antenna elements 48A during the N time slots. Receiver 80 may, for example, gather the first wireless performance metric data from the wireless signals 46 received by the first set of antenna elements 48A during this time period (e.g., while processing operation 114 of FIG. 7, for performing the beam alignment procedure at operation 100 or the beam tracking procedure at operation 104 of FIG. 6).

At the same time, the second set of antenna elements 48B may reflect incident wireless signals 46 during the N time slots. BS 34 may receive at least some of the reflected wireless signals. BS 34 may, for example, gather the second wireless performance metric data from the reflected wireless signals 46 received at BS 34 during this time period (e.g., while processing operation 116 of FIG. 7, for performing the beam alignment procedure at operation 100 or the beam tracking procedure at operation 104 of FIG. 6).

In the example of FIG. 9, the first set of antenna elements 48A includes antenna elements 48 from even-numbered columns whereas the second set of antenna elements 48B includes antenna elements 48 from odd-numbered columns of the array. This is illustrative and non-limiting. In general, the first set of antenna elements 48A and the second set of antenna elements 48B may be distributed in any desired pattern or arrangement across the array of antenna elements 48 in HRIS 50 (e.g., in different rows, in groups of rows, groups of columns, diagonal stripes, in an interleaved or interspersed pattern, or in any other desired pattern having any desired shape).

FIG. 10 is a diagram showing one example of a power domain multiplexing scheme that may be implemented by HRIS 50 (e.g., while performing operation 112 of FIG. 7 and as configured by UE device 10 at operation 110 of FIG. 7). As shown in FIG. 10, HRIS 50 may include multiple sets of antenna elements that are each configured (e.g., through the impedances produced by the corresponding phase shifters 74) to split power from incident wireless signals 46 between receiver 80 and reflected signals by different respective amounts. For example, a first set of antenna elements 48A may be placed in the RX state to receive all (or as much as possible) of the power from the incident wireless signals 46 (e.g., the impedances of the phase shifters may be configured such that all of the incident wireless signals 46 are passed to receiver 80 without reflection back into free space from antenna elements 48). A second set of antenna elements 48B may be concurrently placed in the reflect state to reflect all (or as much as possible) of the power from the incident wireless signals 46 (e.g., the impedances of the phase shifters may be configured such that all of the incident wireless signals 46 are reflected back into free space from antenna elements 48 without passing to receiver 80). A third set of antenna elements 48C may be concurrently placed in an intermediate state to reflect some but not all of the power from the incident wireless signals 46 while also passing some but not all of the power from the incident wireless signals 46 to receiver 80 (e.g., the impedances of the phase shifters may be configured such that some of the incident wireless signals 46 are reflected back into free space from antenna elements 48 and some of the incident wireless signals 46 pass to receiver 80).

Put differently, the first set of antenna elements 48A may be provided with a reflection coefficient as close to 0 as possible (e.g., via appropriate setting of the phase shifters 74 coupled to the first set of antenna elements), the second set of antenna elements 48B may be provided with a reflection coefficient as close to 1.0 as possible (e.g., via appropriate setting of the phase shifters 74 coupled to the first set of antenna elements), and the third set of antenna elements 48C may be provided with a reflection coefficient between 0 and 1.0 (e.g., via appropriate setting of the phase shifters 74 coupled to the first set of antenna elements). If desired, HRIS 50 may include additional sets of antenna elements having other intermediate states for reflecting different proportions of the incident wireless signals 46 (e.g., each intermediate state may correspond to a different respective reflection coefficient between 0 and 1.0). The first, second, and third sets of antenna elements 48 may be distributed in any desired pattern or arrangement across the array of antenna elements 48 in HRIS 50 (e.g., in different rows, in groups of rows, groups of columns, diagonal stripes, in an interleaved or interspersed pattern, or in any other desired pattern having any desired shape). If desired, two or more of the multiplexing schemes in FIGS. 8-10 may be combined while performing beam alignment or beam tracking.

In the examples of FIGS. 8-10, the antenna elements 48 in HRIS 50 are configured to reflect half of the incident wireless signals 46 and to receive half of the incident wireless signals 46 (whether multiplexed across time, space, or power domains). This is illustrative and non-limiting. In general, the antenna elements 48 in HRIS 50 may be configured to reflect any desired proportion (percentage) or amount of the incident wireless signals 46. UE device 10 may control HRIS 50 to configure antenna elements 48 to reflect the desired proportion of the incident wireless signals 46. UE device 10 may dynamically adjust the proportion of incident wireless signals 46 that are reflected overtime (e.g., across N time slots using the time domain multiplexing scheme of FIG. 8), space (e.g., across the space spanned by the array of antenna elements using the spatial domain multiplexing scheme of FIG. 9), and/or power (e.g., including the proportion of incident wireless signals 46 reflected by any given antenna element 48 as shown in the power domain multiplexing scheme of FIG. 10).

The proportion of incident wireless signals 46 that are reflected by antenna elements 48 may be characterized by the parameter $\gamma$ (e.g., parameter $\gamma$ may define HRIS resource allocation with respect to RX-centric beamforming and reflect-centric beamforming). The proportion of incident wireless signals 46 that are received by receiver 80 rather than being reflected is therefore characterized by $1-\gamma$. Parameter $\gamma$ may have any desired value between 0 and 1.0. A parameter $\gamma$ of 1.0 may, for example, correspond to all antenna elements 48 always being in the reflect state, whereas a parameter $\gamma$ of 0 corresponds to all antenna elements always being in the RX state. Parameters $\gamma$ between 0 and 1.0 represent different situations where the time, spatial, and/or power domain multiplexing schemes of FIGS. 8-10 are used. Parameter $\gamma$ is equal to 0.5 in the examples of FIGS. 8-10. More generally, assuming HRIS 50 has W antenna elements 48 that each have a configured constant $\beta_w$ characterizing the proportion of the incident wireless signal 46 that is reflected by the $w^{th}$ antenna element 48, parameter γ may be defined by equation 1, where mean( ) is the mean operator taken with respect to the next considered time interval.

$$\gamma = \frac{\sum_{1}^{W} \text{mean}(\beta_w)}{W} \quad (1)$$

$$\gamma = \frac{\sum_{1}^{W} \text{mean}(\beta_w)}{W}$$

Figure 11:
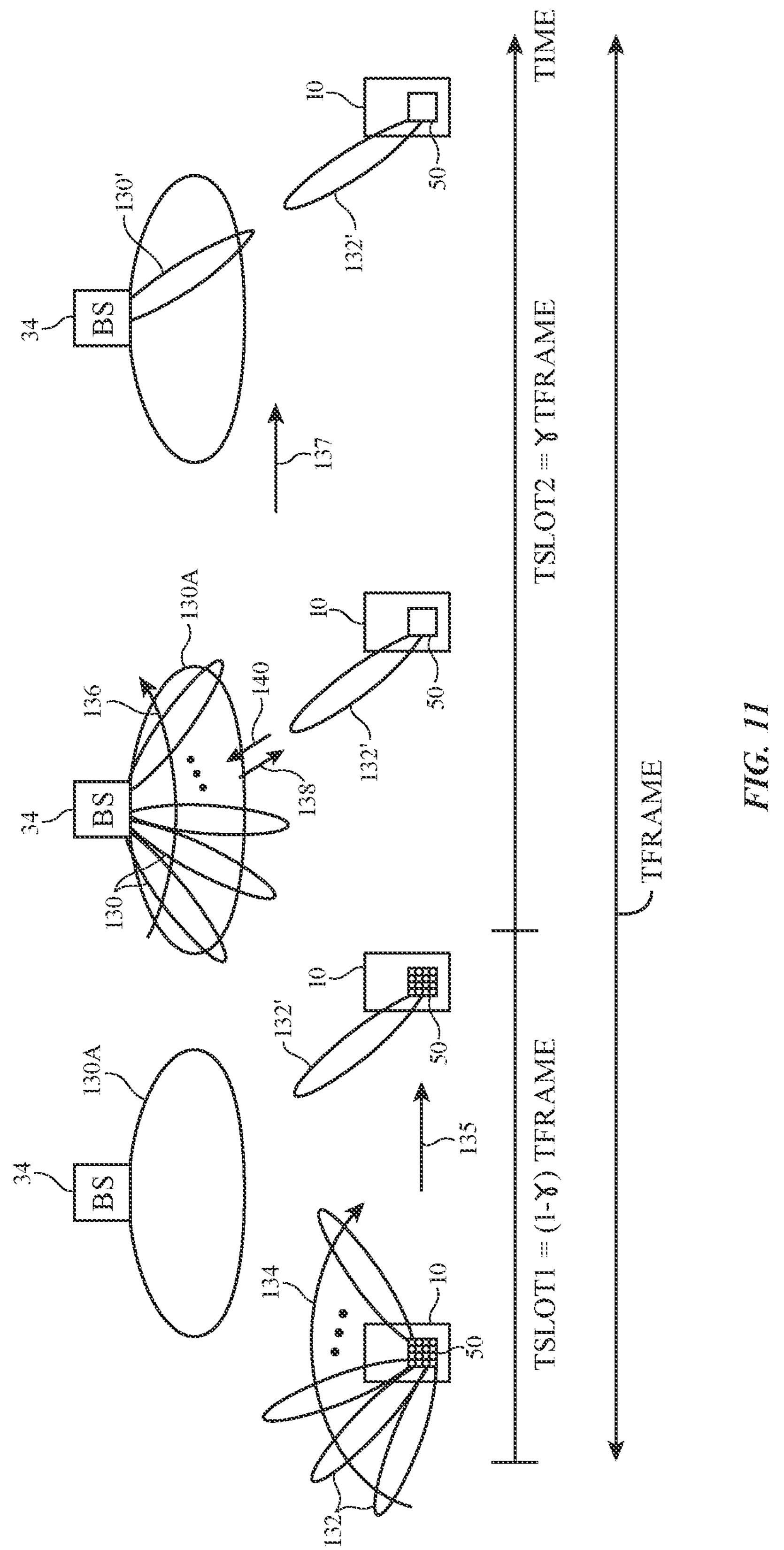
FIG. 11 is a diagram of an illustrative beam acquisition procedure that may be performed by a wireless base station and a hybrid RIS in accordance with some embodiments.
Figure 12:
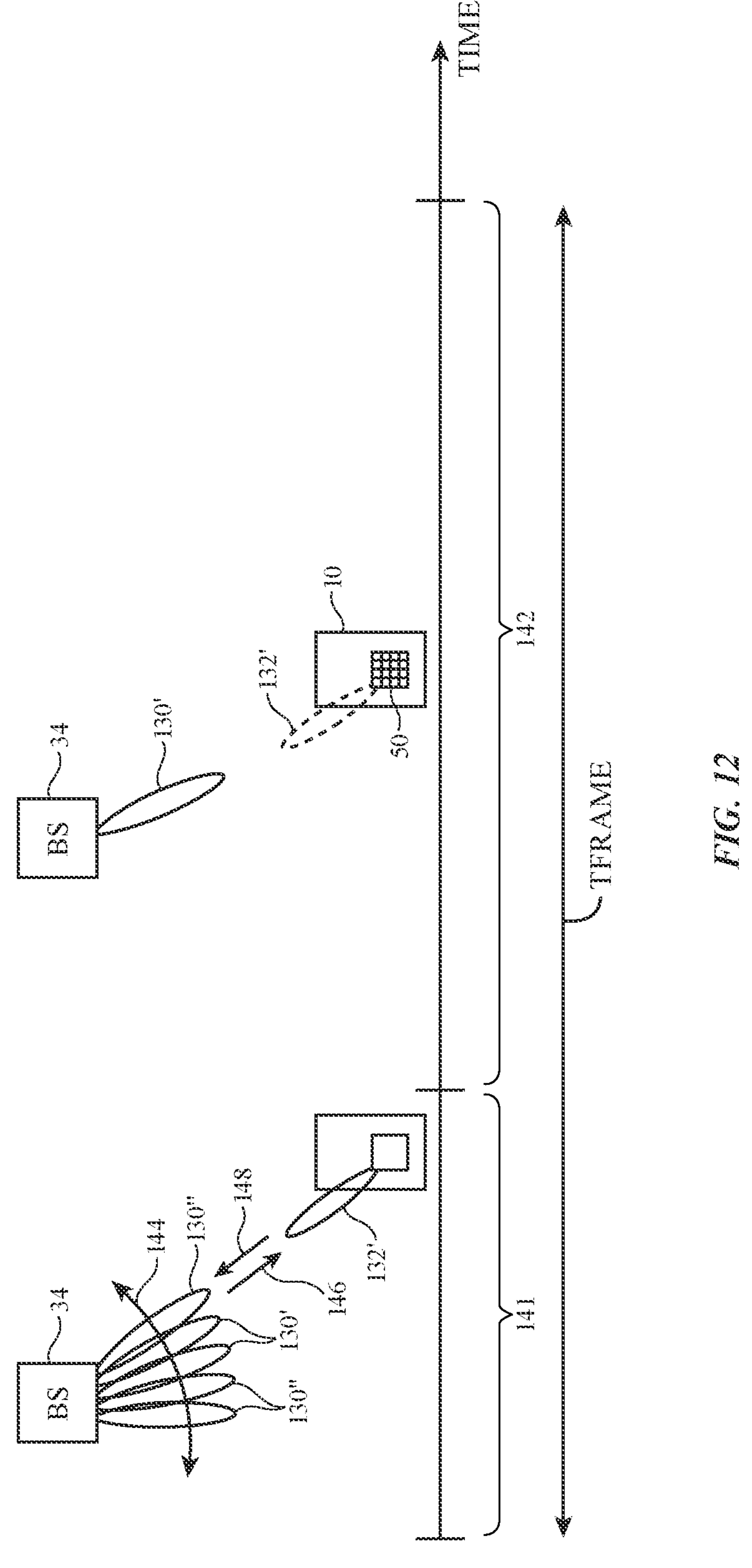
FIG. 12 is a diagram of an illustrative beam tracking procedure that may be performed by a wireless base station and a hybrid RIS under a time domain duplexing scheme in accordance with some embodiments.
Figure 13:
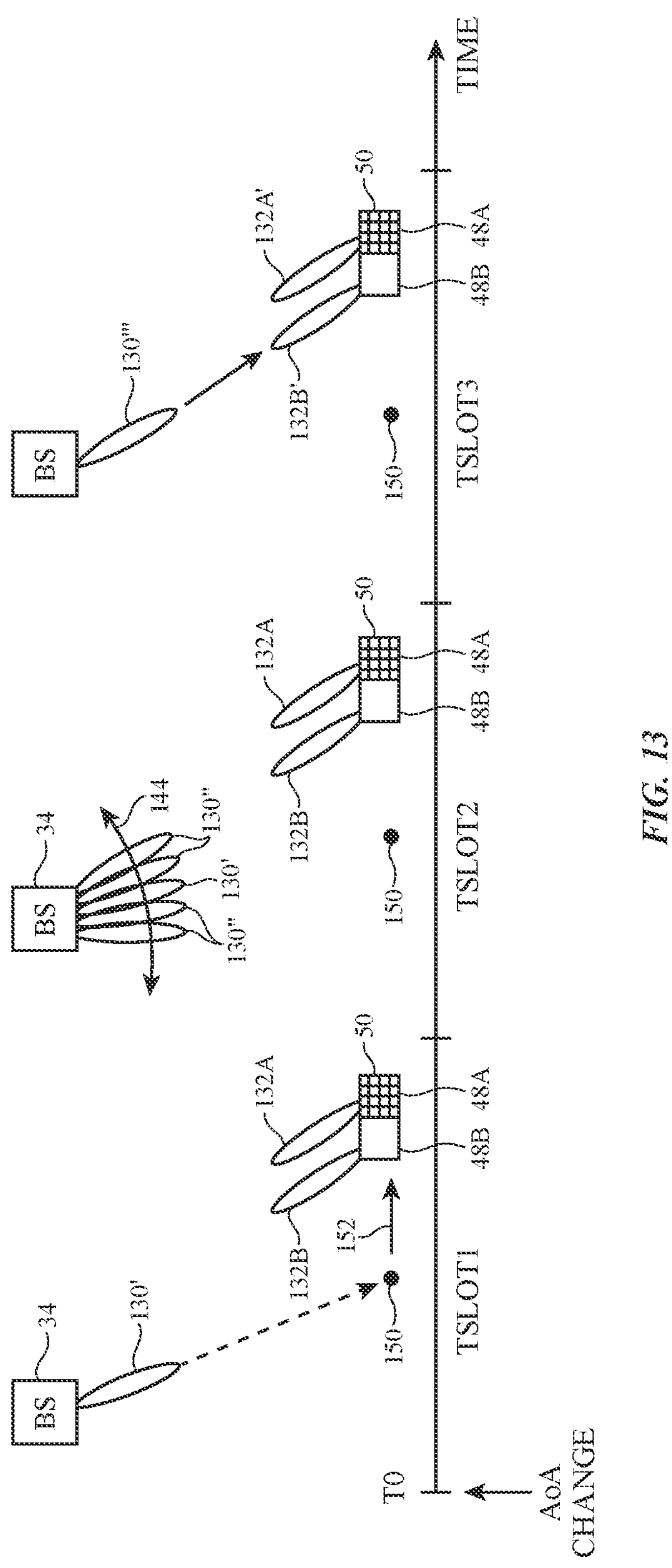
FIG. 13 is a diagram of an illustrative beam tracking procedure that may be performed by a wireless base station and a hybrid RIS under a spatial domain duplexing scheme in accordance with some embodiments.

FIGS. 11-13 illustrate three examples of how HRIS 50 may be used to identify an optimal UE beam and optimal BS beam (e.g., while processing the operations of FIG. 7) for performing wireless communications between UE device 10 and BS 34. In the examples of FIGS. 11-13, it is assumed that AoA does not change significantly (e.g., beyond a range that would be correctable via the beam tracking procedure), that frame duration TFRAME is smaller than the channel coherence time (e.g., AoA may change from one frame to another), a single frame includes one or more time slots TSLOT, that for a certain number of antenna elements 48 (and hence beamwidth), only a certain bandwidth is allowed such that there is no significant beam squint (e.g., where 16 antenna elements at a frequency of 300 GHz would allow for 2% or 6 GHz bandwidth), and that BS 34 includes both a radar transmitter for transmitting wireless signals 46 and a co-located radar receiver for receiving reflected signals from HRIS 50. These examples are illustrative and non-limiting.

FIG. 11 is a diagram showing one example of a beam alignment procedure that may be performed by BS 34 and UE device 10 (e.g., while performing operation 100 of FIG. 8) using an HRIS 50 that is configured (e.g., at operation 110 of FIG. 7) to divide its resources using a time domain multiplexing scheme (e.g., the time domain multiplexing scheme of FIG. 8).

As shown in FIG. 11, the beam alignment procedure may occur during a frame having frame time TFRAME. Frame time TFRAME may be divided into at least a first time slot TSLOT1 and a second time slot TSLOT2. Some or all of the antenna elements 48 on HRIS 50 may receive incident wireless signals 46 (e.g., may be in configured in the RX state) during first time slot TSLOT1 (e.g., the first set of time slots 120 of FIG. 8). The same antenna elements 48 may reflect incident wireless signals 46 (e.g., may be configured in the reflect state) during time slot TSLOT2 (e.g., the second set of time slots 122 of FIG. 8). Time slot TSLOT2 may therefore have a duration equal to γ*TFRAME, whereas time slot TSLOT1 has a duration equal to (1−γ)*TFRAME. Parameter γ may be 0.6, as one example. In general, larger parameters γ may produce less power consumption on HRIS 50 than smaller parameters γ, since HRIS 50 consumes less power when antenna elements 48 simply reflect signals than when antenna elements 48 receive signals that are then decoded and processed at receiver 80.

In performing the beam alignment procedure, HRIS 50 may identify the optimal RIS beam during first time slot TSLOT1 (e.g., while processing operation 114 of FIG. 7). BS 34 may transmit reference signals using a low gain and low directionality BS beam 130A. This may help to ensure that HRIS 50 is able to receive the reference signals regardless of the location/orientation of the HRIS. HRIS 50 may concurrently perform a sweep over RIS beams 132, as shown by arrow 134. HRIS 50 may place its antenna elements 48 in the RX state so receiver 80 (FIG. 3) receives the transmitted reference signals for each RIS beam in the sweep. HRIS 50 may gather first wireless performance metric data for the signals received using each of the RIS beams 132 in the sweep. Once the sweep has been completed (as shown by temporal arrow 135), HRIS 50 may have identified an optimal RIS beam 132' (e.g., the RIS beam from the sweep that produced the strongest of the first wireless performance metric data). UE device 10 may identify the optimal UE beam based on optimal RIS beam 132' (e.g., the UE beam oriented in the same direction as the optimal RIS beam).

BS 34 may identify the optimal BS beam during second time slot TSLOT2 (e.g., while processing operation 116 of FIG. 7). HRIS 50 may continue forming optimal RIS beam 132' during second time slot TSLOT2 but with its antenna elements 48 in the reflect state so that any signals incident within optimal RIS beam 132' are reflected back in the direction of the transmitter rather than passing to receiver 80 on HRIS 50. BS 34 may continue transmitting reference signals using low gain and low directionality BS beam 130A during second time slot TSLOT2. BS 34 may concurrently perform a sweep over its receive (RX) BS beams 130, as shown by arrow 136. For at least one of the RX BS beams in the sweep, BS 34 will receive radar signals 138 that have reflected off the antenna elements 48 in HRIS 50 (as reflected radar signals 140). BS 34 may gather second wireless performance metric data for reflected signals received using each of the RX BS beams 130 in the sweep. Once the sweep has been completed (as shown by temporal arrow 137), BS 34 may have identified an optimal RX BS beam 130' (e.g., the BS beam from the sweep that produced the strongest of the second wireless performance metric data). BS 34 and UE device 10 may then exchange payload data using optimal BS beam 130' (e.g., TX and RX BS beams oriented in the direction of optimal RX BS beam 130') and the optimal UE beam, which may be the same as optimal RIS beam 132' and is therefore sometimes referred to herein as optimal UE beam 132' (e.g., while performing operation 102 of FIG. 6).

When performing beam acquisition in this way, HRIS 50 may allow improved AoA resolution at UE device 10 than in implementations where UE device 10 performs beam acquisition without HRIS 50, thereby allowing for higher beamforming gain. HRIS 50 only receives and gathers wireless performance metric data during first time slot TSLOT1, saving power during second time slot TSLOT2. In addition, UE device 10 does not need to report its optimal UE beam to BS 34, further reducing power consumption and communication overhead. UE device 10 may select parameter γ for use during beam acquisition. If UE device 10 chooses a relatively large parameter γ, BS 34 may trade between its alignment accuracy and time resources required for beam acquisition.

FIG. 12 is a diagram showing one example of a beam tracking procedure that may be performed by BS 34 and UE device 10 (e.g., while performing operation 104 of FIG. 6) using an HRIS 50 that is configured (e.g., at operation 110 of FIG. 7) to divide its resources using a time domain multiplexing scheme (e.g., the time domain multiplexing scheme of FIG. 8).

As shown in FIG. 12, the beam tracking procedure may occur during frame time TFRAME. Frame time TFRAME may be divided into a first time period 141 during which the beam tracking procedure occurs and a second time period 142 during which payload data transmission occurs. In performing the beam tracking procedure, BS 34 may transmit a synchronization signal (SS) burst (e.g., in radar signal 146) using optimal BS beam 130' (e.g., as identified while performing the beam acquisition procedure). BS 34 may sweep over a set of BS beams 130" adjacent to or around optimal BS beam 130' while transmitting SS bursts, as shown by arrow 144. The beam tracking procedure may be performed periodically or may be triggered by UE device 10 or BS 34 when an event is detected such as a beam failure or the gathering of wireless performance metric data that falls below a threshold value.

In implementations where beam tracking is performed without HRIS 50, UE device 10 needs to gather wireless performance metric data from the SS bursts transmitted using each of the BS beams in the sweep. The UE device needs to identify an updated optimal BS beam based on the wireless performance metric data and then needs to report the updated optimal BS beam to BS 34. In implementations where beam tracking is performed with HRIS 50, HRIS 50 may place its antenna elements 48 in the reflect state, illustrated by optimal RIS beam 132' in solid line, so the antenna elements reflect the incident SS bursts (as reflected radar signal 148) rather than receiving the incident SS bursts. Receiver 80 may be inactive at this time, thereby saving power and other processing resources at HRIS 50 and UE device 10.

BS 34 may gather second wireless performance metric data in response to the reflected SS bursts received using each of the RIS beams in the sweep. Once the sweep has been completed, BS 34 may have identified an updated optimal BS beam 130' (e.g., the BS beam from the sweep that produced the strongest of the second wireless performance metric data). BS 34 and UE device 10 may then exchange payload data using optimal BS beam 130' and the optimal RIS (UE) beam 132' during second time period 142. During second time period 142, the antenna elements 48 in HRIS 50 may be placed in the receive state, as illustrated by the shading of HRIS 50 and the dashed optimal UE beam 132'. In this way, UE device 10 may hand over SS burst measurement to BS 34 using HRIS 50, allowing UE device 10 to save processing resources and power that would otherwise be used measuring the SS bursts. UE device 10 may also omit additional signaling overhead associated with reporting the SS burst measurements or an optimal BS beam to BS 34.

FIG. 13 is a diagram showing one example of a beam tracking procedure that may be performed by BS 34 and UE device 10 (e.g., while performing operation 104 of FIG. 6) using an HRIS 50 that is configured (e.g., at operation 110 of FIG. 7) to divide its resources using a spatial domain multiplexing scheme (e.g., the spatial domain multiplexing scheme of FIG. 9). UE device 10 is co-located with HRIS 50 but has been omitted from FIG. 13 for the sake of clarity.

As shown in FIG. 13, at time TO, the AoA between BS 34 and UE device 10 may change. For example, UE device 10 may move away from an initial position 150, as shown by arrow 152. During first time slot TSLOT1, BS 34 may transmit payload data using an optimal BS beam 130' oriented towards the previous position 150 of UE device 10. During first time slot TSLOT1, BS 34 may measure a reduction in beam quality (e.g., a reduction in the quality of reflected signals received at BS 34 or other gathered wireless performance metric data). HRIS 50 may include a first set of antenna elements 48A in the RX state and a second set of antenna elements 48B in the reflect state. First set of antenna elements 48A may form a RIS beam 132A whereas second set of antenna elements 48B concurrently forms a RIS beam 132B. RIS beam 132A and RIS beam 132B may be oriented in the same direction and may be misaligned with respect to BS 34 after the UE device has moved.

During second time slot TSLOT2, BS 34 may perform a sweep over BS beams 130" around optimal BS beam 130', as shown by arrow 144. BS 34 may continue to transmit payload data using each BS beam of the sweep. A first portion of the transmitted signals (downlink payload data) may be received by antenna elements 48A on HRIS 50 (using RIS beam 132A) while a second portion of the transmitted signals (payload data) is concurrently reflected by antenna elements 48B on HRIS 50 (using RIS beam 132B). Receiver 80 on HRIS 50 may receive the payload data using antenna elements 48A and may gather first wireless performance metric data using the received payload data. HRIS 50 may identify an updated optimal RIS beam from the first wireless performance metric data. Antenna elements 48A may form the updated optimal RIS beam (as optimal RIS beam 132A') while antenna elements 48B concurrently form the updated optimal RIS beam (as optimal RIS beam 132B'), which point towards BS 34 given the new position of UE device 10, during third time slot TSLOT3. UE device 10 may also update its optimal UE beam to match the optimal RIS beam.

BS 34 may concurrently gather second wireless performance metric data from the reflected signal received from antenna elements 48B (e.g., using a radar receiver at BS 34). BS 34 may identify an updated optimal BS beam 130''' from the second wireless performance metric data. BS 34 may form updated optimal BS beam 130''', which points towards the new position of UE device 10, during third time slot TSLOT3. At this point, both UE device 10 and BS 34 have corrected their respective signal beams for the misalignment produced when UE device 10 moved away from its initial position 150. Performing beam tracking using downlink payload data transmitted by BS 34 may serve to reduce overhead and reaction time relative to using separate reference signals. HRIS 50 may use antenna elements 48A in the RX state to continue to perform received signal measurements during each of the time slots (e.g., to measure RIS/UE beam quality). The examples of FIGS. 11-13 are illustrative and, in general, any desired beam acquisition and tracking procedures may be performed using HRIS 50. HRIS 50 may include any desired number of antenna elements 48 as required to achieve a target SNR for reflected signals received at BS 34. HRIS 50 may include dozens, hundreds, thousands, more than 3000, more than 10,000, more than 15,000, or more than 50,000 antenna elements 48, as examples.

UE device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-13 may be performed by the components of UE device 10, HRIS 50, and/or BS 34 using software, firmware, and/or hardware (e.g., dedicated circuitry or hardware). Software code for performing these operations may be stored on non-transitory computer readable storage media (e.g., tangible computer readable storage media) stored on one or more of the components of UE device 10, HRIS 50, and/or BS 34. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of UE device 10, HRIS 50, and/or BS 34. The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. A reconfigurable intelligent surface (RIS) co-located with a user equipment (UE) device, the RIS comprising:

an array of antenna elements configured to transmit signals for the UE device;

adjustable devices coupled to the antenna elements;

a receiver, wherein the adjustable devices configure a first set of antenna elements in the array to pass an incident signal to the receiver and configure a second set of antenna elements in the array to reflect the incident signal; and one or more processors configured to adjust impedances of the adjustable devices.

2. The RIS of claim 1, wherein the adjustable devices configure the first set of antenna elements to pass the incident signal to the receiver during a first time slot and configure the second set of antenna elements to reflect the incident signal during a second time slot that is different from the first time slot.

3. The RIS of claim 1, wherein the adjustable devices configure the first set of antenna elements to pass the incident signal to the receiver concurrent with reflection of the incident signal by the second set of antenna elements.

4. The RIS of claim 1, wherein the adjustable devices configure a third set of antenna elements in the array to pass a first portion of the incident signal to the receiver while concurrently reflecting a second portion of the incident signal.

5. The RIS of claim 4, wherein the RIS is configured to adjust a ratio of the first portion to the second portion over time.

6. The RIS of claim 1, wherein the adjustable devices are configured to impart the incident signal passed to the receiver with first phase shifts and are configured to impart the incident signal reflected by the antenna elements with second phase shifts that are a function of the first phase shifts.

7. The RIS of claim 6, wherein the RIS is configured to adjust the first phase shifts and the second phase shifts over time.

8. The RIS of claim 1, wherein the RIS is disposed within the UE device.

9. The RIS of claim 1, wherein the RIS is layered onto a housing of the UE device.

10. The RIS of claim 1, wherein the adjustable devices comprise programmable photodiodes.

11. The RIS of claim 1, wherein the adjustable devices comprise diode switches.

12. The RIS of claim 1, wherein the adjustable devices comprise adjustable impedance matching circuits.

13. The RIS of claim 1, wherein the adjustable devices comprise adjustable phase shifters.

14. The RIS of claim 1, wherein the adjustable devices comprise varactor diodes.

15. The RIS of claim 1, wherein the adjustable devices comprise adjustable amplifiers.

16. A reconfigurable intelligent surface (RIS) co-located with a user equipment (UE) device, the RIS comprising:

an array of antenna elements configured to transmit signals for the UE device;

adjustable devices coupled to the antenna elements; and a receiver, wherein the adjustable devices configure a first set of antenna elements in the array to pass an incident signal to the receiver and configure a second set of antenna elements in the array to reflect the incident signal, wherein the RIS is configured to adjust a number of antenna elements in the first set and a number of antenna elements in the second set over time.

17. A method of operating a reconfigurable intelligent surface (RIS), the method comprising:

transmitting signals using an array of antenna elements;

configuring, using adjustable devices coupled to the antenna elements, a first set of the antenna elements to pass an incident signal to a receiver; and configuring, using the adjustable devices, a second set of the antenna elements to reflect the incident signal concurrent with the first set of antenna elements passing the incident signal to the receiver.

* * * * *